United States Patent [19]

Haneda et al.

[11] Patent Number: 5,172,132
[45] Date of Patent: Dec. 15, 1992

[54] DIGITAL IMAGE FORMING DEVICE AND METHOD FOR FORMING AN IMAGE FROM A PLURALITY OF DOTS

[75] Inventors: Satoshi Haneda; Masakazu Fukuchi, both of Hachioji, Japan

[73] Assignee: Konica Corporation, Tokyo, Japan

[21] Appl. No.: 664,132

[22] Filed: Mar. 4, 1991

[30] Foreign Application Priority Data

| Mar. 6, 1990 | [JP] | Japan | 2-54251 |
| Apr. 12, 1990 | [JP] | Japan | 2-96683 |
| Apr. 12, 1990 | [JP] | Japan | 2-96684 |
| Apr. 12, 1990 | [JP] | Japan | 2-96685 |

[51] Int. Cl.$^5$ .................................................. H04N 1/21
[52] U.S. Cl. ................................. 346/1.1; 346/108; 358/296; 355/219
[58] Field of Search ............. 346/108, 1.1, 107 R, 346/160; 358/296, 300, 302; 355/219, 223, 296

[56] References Cited

U.S. PATENT DOCUMENTS 4,623,243  11/1986  Iijima et al. .................... 355/219

FOREIGN PATENT DOCUMENTS 62-39976  2/1987  Japan .

Primary Examiner—Mark J. Reinhart
Attorney, Agent, or Firm—Frishauf, Holtz, Goodman & Woodward

[57] ABSTRACT

An image forming device and method for an electrophotographic process wherein a digital image forming device forms an electrostatic latent image on a photoreceptor by beam modulation of digital image data from a computer or the like. The electrostatic latent image is formed in the form of dots by a light-modulated laser beam, and the electrostatic latent image is developed to form an image. A reference wave signal generating circuit is provided for generating a reference wave signal of a predetermined wave form, and a modulating circuit modulates an image density signal with the reference wave signal and outputs a modulated signal. The modulating signal is used to control a laser which emits light modulated in accordance with the modulating signal.

15 Claims, 29 Drawing Sheets

FIG.10A PICTURE ELEMENT CLOCK
FIG.10B ANALOGUE DENSITY SIGNAL
FIG.10C REFERENCE WAVE SIGNAL
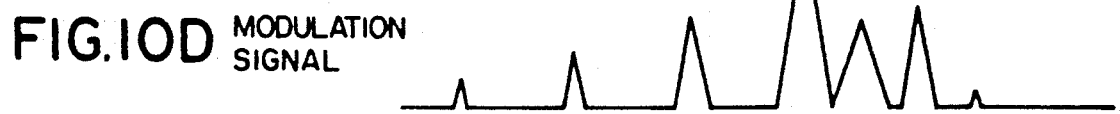
FIG.10D MODULATION SIGNAL
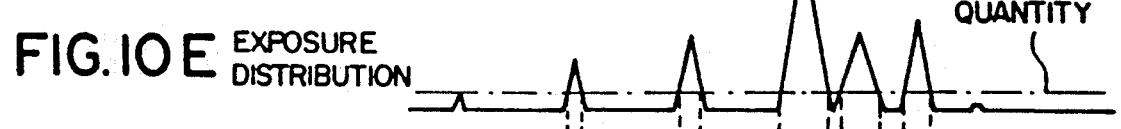
FIG.10E EXPOSURE DISTRIBUTION
HALF-VALUE OF EXPOSURE LIGHT QUANTITY
FIG.10F LATENT IMAGE FIG.14A PICTURE ELEMENT CLOCK (DCK) 
FIG.14B ANALOGUE DENSITY SIGNAL 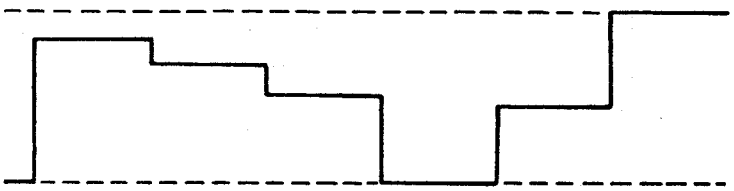
FIG.14C ANALOGUE DENSITY SIGNAL 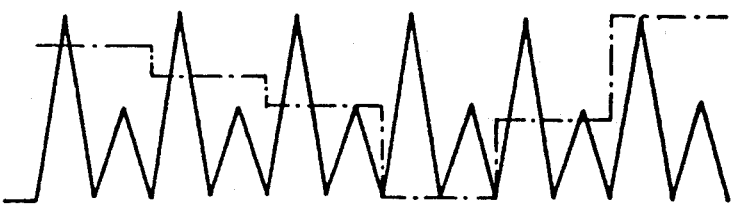
FIG.14D PULSE WIDTH MODULATION SIGNAL 
FIG.14E EXPOSED DOT DISTRIBUTION 
HALF-VALUE OF EXPOSURE LIGHT QUANTITY
FIG.14F LATENT IMAGE 

FIG. 15A ANALOGUE DENSITY SIGNAL 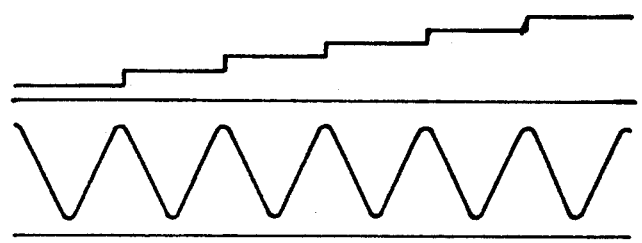
FIG. 15B REFERENCE WAVE SIGNAL
FIG. 15C DENSITY SIGNAL 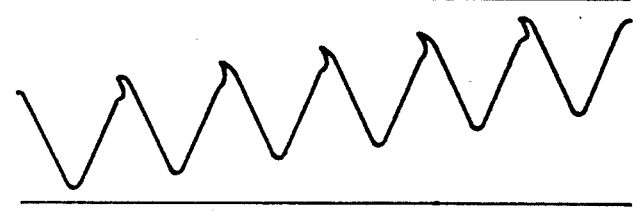
FIG. 15D EXPOSURE DISTRIBUTION 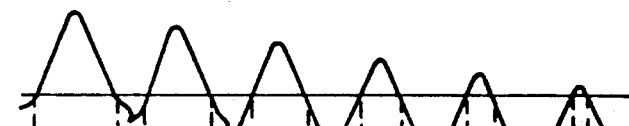
FIG. 15E LATENT IMAGE 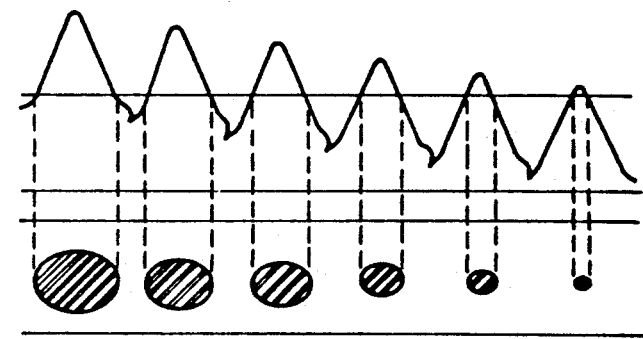

FIG. 16A ANALOGUE DENSITY SIGNAL

FIG. 16B REFERENCE WAVE SIGNAL

FIG. 16C DENSITY SIGNAL

FIG. 16D EXPOSURE DISTRIBUTION

FIG. 16E LATENT IMAGE

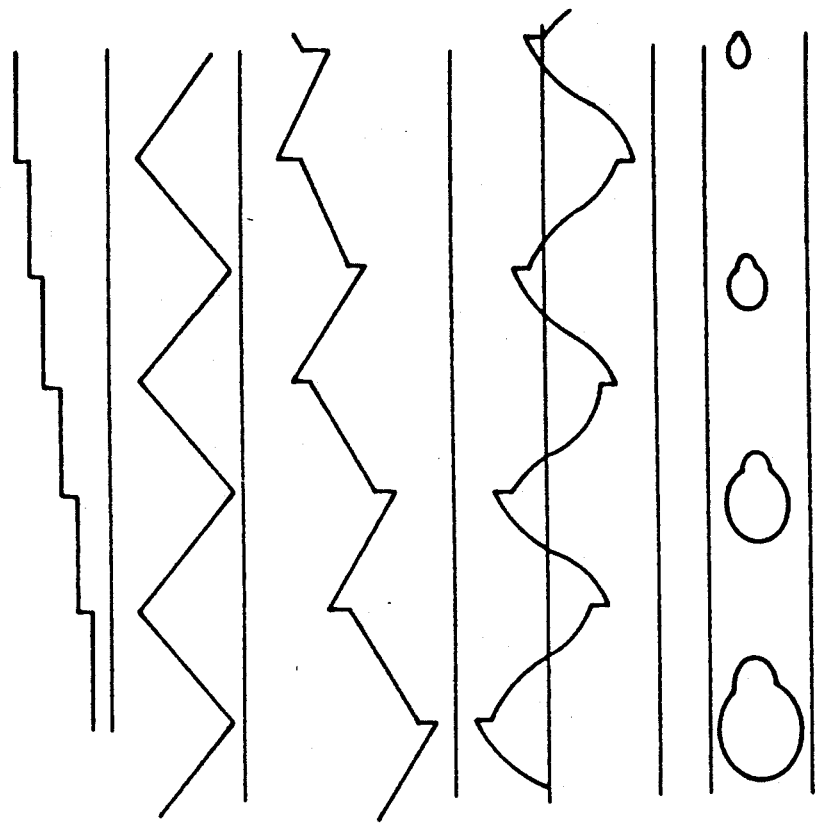
FIG. 17A ANALOGUE DENSITY SIGNAL
FIG. 17B REFERENCE WAVE SIGNAL
FIG. 17C DENSITY SIGNAL
FIG. 17D EXPOSURE DISTRIBUTION
FIG. 17E LATENT IMAGE

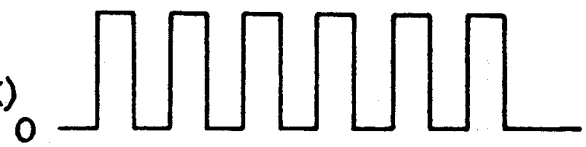
FIG. 19A STANDARD PULSE (SCK)
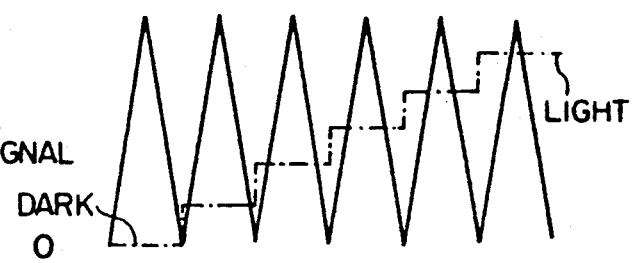
FIG. 19B ANALOGUE DENSITY SIGNAL
LIGHT
DARK
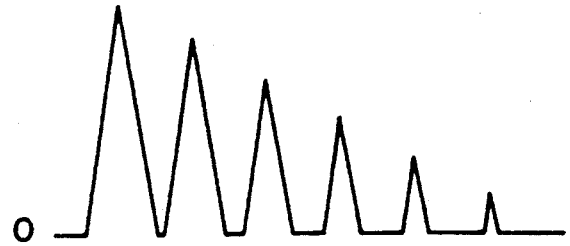
FIG. 19C MODULATION SIGNAL
FIG. 19D LEVEL SHIFT SIGNAL

DIGITAL IMAGE FORMING DEVICE AND METHOD FOR FORMING AN IMAGE FROM A PLURALITY OF DOTS

BACKGROUND OF THE INVENTION

1. Field of the Invention

The present invention relates to an image forming device and a method for an electrophotographic process, and, in particular, to a digital image forming device which forms an electrostatic latent image on a photoreceptor and a method of forming this electrostatic latent image by beam modulation of digital image data from a computer or the like.

2. Description of the Prior Art

In recent years, in the field of electrophotographic copying in which an electrostatic latent image is formed on a photoreceptor and the latent image is developed to obtain a visible image, a large amount of research and development has been conducted into methods of forming quality images by adopting a digital method with which it is possible to form high quality images in which improved image quality, conversion, and editing are easily accomplished.

In this image forming method, a digital image signal from a computer or a copy document is spot exposed on a photoreceptor, which is uniformly charged by means of a luminous element such as a laser, an LED array, a liquid crystal shutter, or the like, and formed as dots.

Optical write-in systems which modulate light from a digital image signal which have been proposed are (1) a device in which an acousto-optic modulator is interposed in a laser optical system and light is modulated by means of an acousto-optic modulator; and (2) a device using a semiconductor laser in which the laser beam intensity is directly modulated.

A beam which is modulated by a digital image signal has a circular or oval brilliancy distribution which is close to the shape of a normal distribution curve in which the base extends laterally. For example, a semiconductor laser beam usually exhibits an extremely narrow circular or oval pulse width in either the main scanning direction or the secondary scanning direction or both, on a photoreceptor with a 1 to 6 mW brilliance.

However, even when a desirable electrostatic latent image formed by a beam of this type is developed by reversal developing and a dot image formed, time and time again an image of poor clarity is obtained.

In a device in which the beam strength is direct multi-valued modulated, the beam intensity change is large versus the drive current of the semiconductor laser, and with heat and the like causing a poor environment, there is a tendency toward fluctuation. In addition, the response for the drive signal is a problem, and it is necessary to make compensation in the circuit. For this reason, pulse width modulation rather than intensity modulation is used exclusively as the multivalued modulation method (see Japanese Laid Open Patent Application 62-39976).

These photoreceptors usually have a high sensitivity in the initial stages of exposure. This causes a tendency toward fluctuation in the photoreceptor so that a clear, dot-shaped latent image is not formed.

There are reasons, according to the type of image, for example, for attaching more importance to resolution rather than halftone reproduction for characters and drawings, and also reasons for attaching more importance to halftone reproduction for scenery and human images. In this field, methods such as the dither method or the density pattern method are used, and reproduction of a halftone image has been considered.

However, there are documents on which halftone images and line images are mixed on the same document. In this type of document it is necessary that image reproduction be carried out in which importance is placed on both gradation reproducing and resolution depending on the type of the image.

However, as photoreceptors used in this type of image forming device, there are a low-$\gamma$ type light damping photoreceptor which shows so-called low-$\gamma$ type light damping characteristics in which light damping, as shown in FIG. 1A, is large in the early stages of exposure, and slow in the middle stages of exposure, and a high-$\gamma$ type light damping photoreceptor which has the feature of high-$\gamma$ type light damping characteristics which are fast in the middle stages of exposure, as shown in FIG. 1B.

Low-$\gamma$ type light damping photoreceptors with a double-layer configuration are commonly known which utilize a charge-developing layer of the Se, CdS or the like single layer type, which is usually used with OPC, and a charge transport layer. However, many photoreceptors which show the abovementioned semiconductor characteristics, when in a low electric field rather than a high electric field usually show low light sensitivity, so when the amount of light declines the potential drops, and, at the same time, the light sensitivity drops. For this reason, an exclusive model of photoreceptor is used in an analogue copying machine for gradation reproducing.

However, because a photoreceptor which shows low-$\gamma$ type light damping characteristics has high sensitivity in the early stages of exposure, and low sensitivity in the middle stages of exposure, the potential distribution of a dot type of image is wide, and because the image is unclear, from the image density distribution of the dots, the dots have a wide base and an indistinct contour.

Therefore, in a device in which direct multivalue modulation of the beam intensity is performed, the beam intensity change is large with respect to the drive current of the semiconductor layer. There is a tendency toward fluctuation caused by an environment such as heat or the like and, in addition, there is a problem relating to the response to a drive signal, so that circuit compensation is required. For this reason, pulse width modulation rather than intensity modulation is exclusively used as a multivalue modulation method.

On the other hand, because light damping is steep in a high-$\gamma$ type photoreceptor in the middle stages of exposure, in the case where an analogue copying machine is used, gradation reproducing is inadequate. In addition, because there is the drawback that the light damping curve is changed and deteriorates from the repeated action of this process, this method cannot be effectively utilized in an image forming device.

SUMMARY OF THE INVENTION

A first object of the present invention is to provide, with due consideration to the drawbacks of such conventional devices and methods, a digital image forming device for producing a stable image with good clarity using a high $\gamma$-type photoreceptor, specifically a digital image forming device with a true halftone reproduction by means of dots.

A second object of the present invention is to provide an image forming device which forms an image with high stability of clarity from good resolution or gradation reproducing corresponding to the type of image, specifically, with a true halftone and high resolution reproduction by means of dots.

A third object of the present invention is to provide an image forming device which can form a stable latent image with improved response to a drive signal and reduction of beam intensity changes through fluctuation from environmental causes such as heat and the like.

A fourth object of the present invention is to provide a method of forming a latent image which can be recorded at high density by an optical scanning system without encountering beam diameter expansion caused by the modulation transfer function (MTF) of the optical system.

The first object of the present invention is achieved by the provision of a digital image forming device wherein an electrostatic latent image shaped by dots is formed on a photoreceptor by a beam which is optically modulated by an acousto-optic modulator on which a high frequency voltage is impressed, and which performs by reversal developing; wherein light damping characteristics are provided whereby the potential of the photoreceptor is not damped in the initial stages of exposure, but is steeply damped in the middle stages of exposure; and wherein a high frequency voltage modulates the intensity of a concentrated signal from a reference wave signal.

In addition, if phthalocyanine is contained in a photoconductive semiconductor powder on the abovementioned photoreceptor, the effect can be even more clearly demonstrated.

By repeating the charging, latent image forming, and developing processes, a toner image is superimposed on the photoreceptor.

Further, it is also desirable that the electrostatic latent image formed on the photoreceptor be developed by a non-contact method.

The second object of the present invention is achieved by the provision of an image forming device for performing exposure modulation based on a modulation signal obtained from the comparison of an image density signal and a reference wave signal, wherein the reference wave signal has multiple peaks in one period.

In addition, the effect of the present invention can be even more clearly demonstrated by the provision of an image forming device wherein an electrostatic latent image shaped by dots is formed on a photoreceptor by a beam which is optically modulated by an acousto-optic modulator on which a high frequency voltage is impressed, and which performs by reversal developing; wherein light damping characteristics are provided by which the potential of the photoreceptor is not damped in the initial stages of exposure, but is steeply damped in the middle stages of exposure; and wherein, under the high frequency voltage, the image density signal modulated by a reference wave signal which has multiple peaks in one period is used as the modulated signal.

In addition, the second object of the present invention is further achieved by the provision of a digital image forming device wherein an electrostatic latent image shaped by dots is formed on a photoreceptor by a beam which is intensity modulated by a signal which modulates a light-emitting element such as a semiconductor laser or an LED or the like, and performs by reversal developing; and wherein light damping characteristics are provided whereby the potential of the photoreceptor is not damped in the initial stages of exposure, but is steeply damped in the middle stages of exposure; and wherein the image density signal modulated from a reference wave signal which has multiple peaks in one period is used as the modulated signal.

The second object of the present invention is still further achieved by the provision of image forming device wherein an electrostatic latent image shaped by dots is formed on a photoreceptor by a beam which is modified by a signal obtained from the comparison of an image density signal and a reference wave signal in a comparator, and which performs by reversal developing; and wherein light damping characteristics are provided whereby the potential of the photoreceptor is not damped in the initial stages of exposure, but is steeply damped in the middle stages of exposure; and wherein the reference wave has multiple peaks in one period.

In addition, in the image forming device, the peak value of the reference wave signal can be independently varied.

The third object of the present invention is achieved by the provision of an image forming device wherein an image is formed by the oscillation of a semiconductor laser by a modulated signal modulating an image density signal by a reference wave signal on a photoreceptor for which light damping characteristics are provided whereby the potential of the photoreceptor is not damped in the initial stages of exposure, but is steeply damped in the middle stages of exposure; and wherein a direct current component is provided on a modulated signal corresponding to the white background of the image density signal.

Also, the effect of the present invention can be even more demonstrated if the exposure intensity corresponding to the white background is almost the same or less than half the quantity of light used for exposure.

Further, the image density signal is intensity modulated by the reference signal.

In addition, this object is further achieved by using the modulated signal which is a high frequency signal amplitude modulated using the modulated signal which is the image density signal modulated by the reference signal.

Also, this object is further achieved by pulse width modulation of the image density signal by the reference wave signal.

The fourth object of the present invention is achieved by the provision of a latent image forming method whereby multiple optical scans are made of the photoreceptor at the same position, and of the photoreceptor provided with light damping characteristics whereby the potential of the photoreceptor is not damped in the initial stages of exposure, but is steeply damped in the middle stages of exposure; and when the half-value of the amount of light required for exposure by the photoreceptor is $P_{\frac{1}{2}}$, the amount of light P used for exposure and the number of scans n satisfy the following relationship:

$$1/n \times P_{\frac{1}{2}} < P < 1/(n-1) \times P_{\frac{1}{2}}.$$

Here, the amount of light P used for exposure shows the amount of light from the scanner optical system on each unit of area of the photoreceptor.

$P_{\frac{1}{2}}$ is half the required amount of light for exposure to reduce the potential on the surface of the photoreceptor by half.

BRIEF DESCRIPTION OF THE DRAWINGS

These and other objects, features, and advantages of the present invention will become more apparent from the following description of the preferred embodiments taken in conjunction with the accompanying drawings, in which:

FIGS. 10A to 10F are timing charts for explaining the image forming process of the image forming device when the reference signal is a first triangular wave.

FIGS. 14A to 14F are timing charts for explaining the operation of the scanner optical system of the image forming device when the reference signal is a second triangular wave.

FIGS. 15A to 15E are schematic views showing the modulating signal, the exposure distribution, and the potential distribution of the electrostatic latent image when the reference signal is a third triangular wave.

FIGS. 16A to 16E are schematic views showing the modulating signal, the exposure distribution, and the potential distribution of the electrostatic latent image when the reference signal is a fourth triangular wave.

FIGS. 17A to 17E are schematic views showing the modulating signal, the exposure distribution, and the potential distribution of the electrostatic latent image when the reference signal is a fifth triangular wave.

FIGS. 19A to 19D are timing charts showing the waveforms appearing in the parts of the first embodiment of the drive circuit.

DETAILED DESCRIPTION

The details of the present invention will now be explained based on drawings of embodiments of the present invention.

The explanation will be made based on embodiments of image forming devices provided with different scanner optical systems. The following two image forming devices have identical structures, other than the scanning optical systems and the drive circuits. Therefore, a description will first be given of the common structure.

Figure 1A:
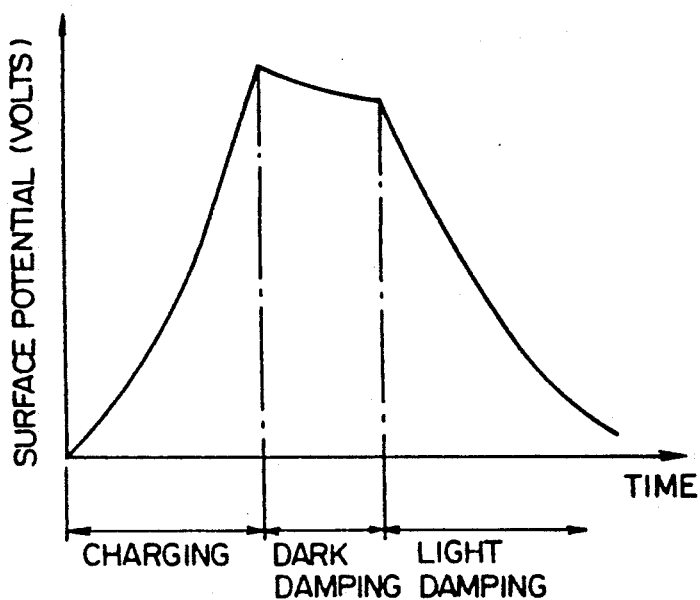
FIG. 1A is a schematic illustration showing the characteristics of a low-γ type photoreceptor.
Figure 1B:
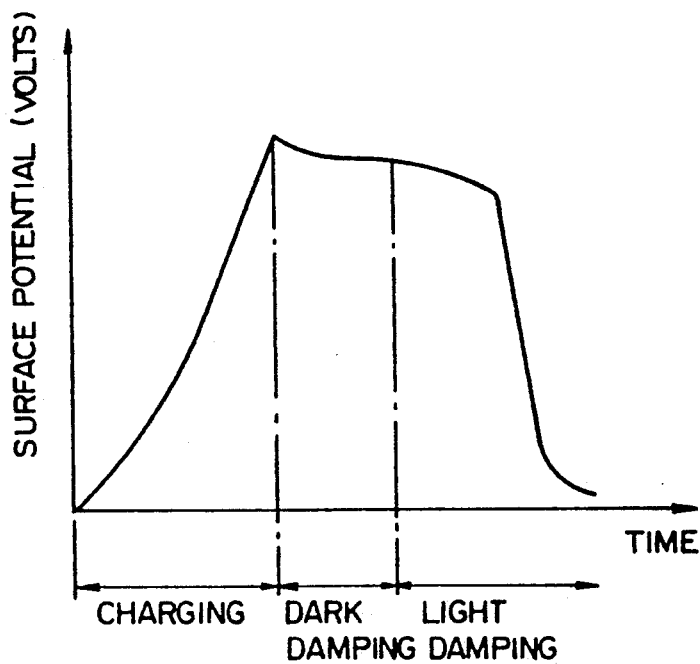
FIG. 1B is a schematic illustration showing the characteristics of a high-γ type photoreceptor.
Figure 2:
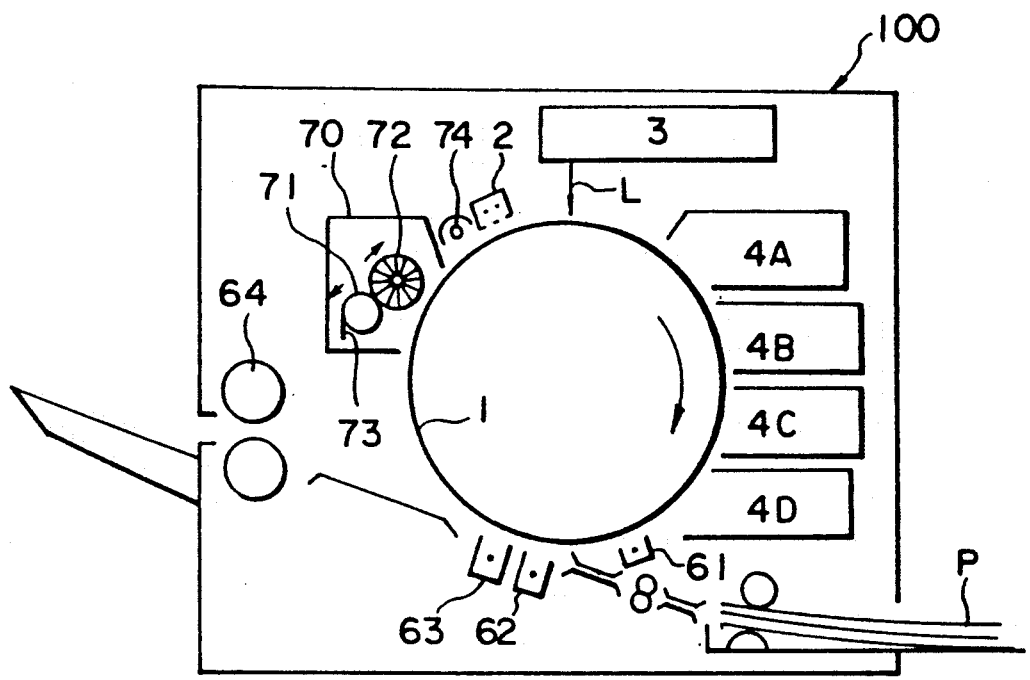
FIG. 2 is a block diagram showing a schematic configuration of a first embodiment of an image forming device of the present invention.
Figure 4:
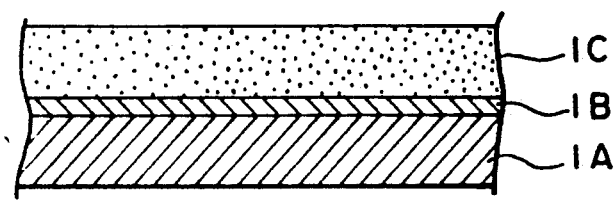
FIG. 4 is a sectional view showing an example of a specific structure for a high-γ type photoreceptor.
Figure 5:
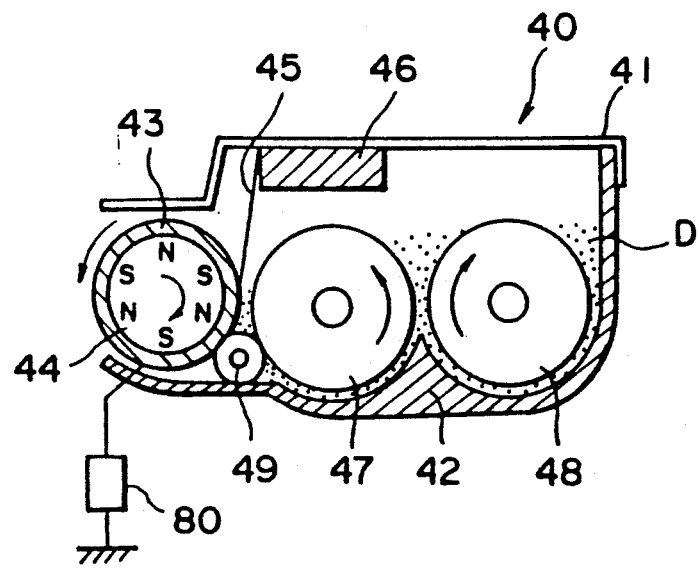
FIG. 5 is a sectional view showing a developing device applied to this embodiment of the image forming device.

FIG. 2 is a sectional view showing a schematic configuration of a first embodiment of an image forming device of the present invention. FIG. 4 is a sectional view showing an example of a specific structure for a high-γ type photoreceptor. FIG. 5 is a sectional view showing a developing device applied to this embodiment of the image forming device.

In this embodiment of a colored image forming device 100 of the present invention, after a photoreceptor 1 is uniformly charged, shading correction, gradation correction, masking correction operations and the like are performed on an image density signal from a computer or a scanner. This digital image density signal is D/A converted, and the resulting analogue image density signal is compared with a reference wave signal with multiple peaks in one period. A dotted electrostatic latent image is then formed by means of spot exposure intensity modulation or pulse width modulation, based on the resulting modulated signal. This image is developed by reversal developing by means of a toner, and a dotted toner image is formed. These exposure and developing processes are repeated and a colored toner image is formed on the photoreceptor 1. A color image is obtained by transferring, separating, and fixing this colored toner image.

The image forming device 100 comprises the drum-shaped photoreceptor (hereinafter, simply photoreceptor) 1 which rotates in the direction indicated by the arrows, a scorotron charging apparatus 2 which gives a uniform electric charge to the photoreceptor 1, a scanner optical system 3, a plurality of developing apparatuses 4A, 4B, 4C, and 4D, charged with yellow, magenta, cyan, and black toner respectively, a pre-transfer charging apparatus 61, a scorotron transfer apparatus 62, a separating apparatus 63, a fixing roller 64, a cleaning device 70, and a neutralization apparatus 74.

The main structure of this embodiment will now be explained.

The photoreceptor 1, as shown in FIG. 4, comprises a conductive support member 1A, an intermediate layer 1B, and a photosensitive layer 1C. The photosensitive layer 1C is about 5 to 100 $\mu$m thick, and preferably 10 to 50 $\mu$m thick. The drum-shaped conductive support member 1A is made from aluminum and has a diameter of 150 mm. The intermediate layer 1B formed on the support member 1A is made from an ethylene-vinyl acetate copolymer and has a thickness of 0.1 $\mu$m. The photosensitive layer 1C is provided on the intermediate layer 1B to a film thickness of 35 $\mu$m.

A drum of aluminum, steel, copper, and the like with a diameter of 150 mm is used as the support member 1A, but this member may also be belt-shaped with a metal layer laminated or evaporated onto paper or a plastic film, or may be a metal belt, such as a nickel belt or the like, fabricated by an electroforming method. It is desirable that the intermediate layer 1B as a photoreceptor withstand a high charge of $\pm 500$ to $\pm 2000$ V, for example, in the case of a positive electric charge, to prevent the entrance of electrons from the conductive support member 1A. It is also desirable that this layer 1B exhibit Hall mobility to obtain superior optical damping characteristics from avalanche developing. For this reason, it is desirable, for example, that 10% by weight of the positive charging type of electric charge transport material described in the specification of Japanese Patent Application 61-1889975 proposed previously by the present applicant be added to the intermediate layer 1B.

Normally, a resin such as the following, used as an exposure layer for electrophotography, can be used for the intermediate layer 1B.

(1) Vinyl-type polymers, such as polyvinyl alcohol (poval), polyvinylmethyl ether, polyvinylethyl ether, and the like.
(2) Nitrogen-contained vinyl polymers such as polyvinylamine, poly-N-vinylimidazole, polyvinylpyridine (quaternary salt), polyvinylpyrrolidone, vinylpyrrolidonevinyl acetate copolymer, and the like.
(3) Polyether-type polymers, such as polyethyleneoxide, polyethyleneglycol, polypropyleneglycol, and the like.
(4) Acrylic-acid-type polymers, such as polyacrylic acid and its salts, polyacrylamide, poly-$\beta$-hydroxyethylacrylate, and the like.
(5) Methacrylic-acid-type polymers, such as polymethacrylic acid and its salts, polymethacrylamide, polyhydroxypropylmethacrylate, and the like.
(6) Ether-cellulose-type polymers, such as methylcellulose, ethylcellulose, carboxymethylcellulose, hydroxyethylcellulose, hydroxypropylmethylcellulose, and the like.
(7) Polyethyleneimine polymers such as polyethyleneimine, and the like.
(8) Polyamino acids such as polyalanine, polyserine, poly-L-glutamic acid, poly-(hydroxyethyl)-L-glutamine, poly-$\delta$-carboxymethyl-L-cystine, polyproline, lysine-tyrosine copolymer, glutamic acid-lysine-alanine copolymer, silk fibroine, casein, and the like.
(9) Starch and starch derivatives, such as starch acetate, hydroxyethyl starch, amine starch, phosphate starch, and the like.
(10) Polymers soluble in a mixture of water and alcohol, such as nylon soluble in polyamide, methoxymethyl nylon (8-type nylon), and the like.

The photosensitive layer 1C basically comprises small particles of phthalocyanine of about 0.1 to 1 $\mu$m in diameter from a photoconductive pigment, which is not used jointly with a charge transport material, an antioxidant, a binder resin, and a binder resin solvent, mixed with dispersion in the 0.1 to 1 $\mu$m diameter particles of phthalocyanine, to prepare an application liquid. This application liquid is applied to the intermediate layer, dried, and heat-treated as required.

In addition, in the case where a photoconductive material and a charge transport material are used jointly, the photoconductive pigment, a small amount of the photoconductive material (1/5 or less, and preferably 1/1000 to 1/10 by weight of the photoconductive pigment of the charge transport material), and an antioxidant are dispersed in a binder resin to provide a photosensitive layer.

In the present invention, because a color toner image is built up on a photoreceptor, a photoreceptor with a spectral sensitivity on the long wave length side is required so that a beam from the write-in optical system does not shield the color toner image.

Figure 3:
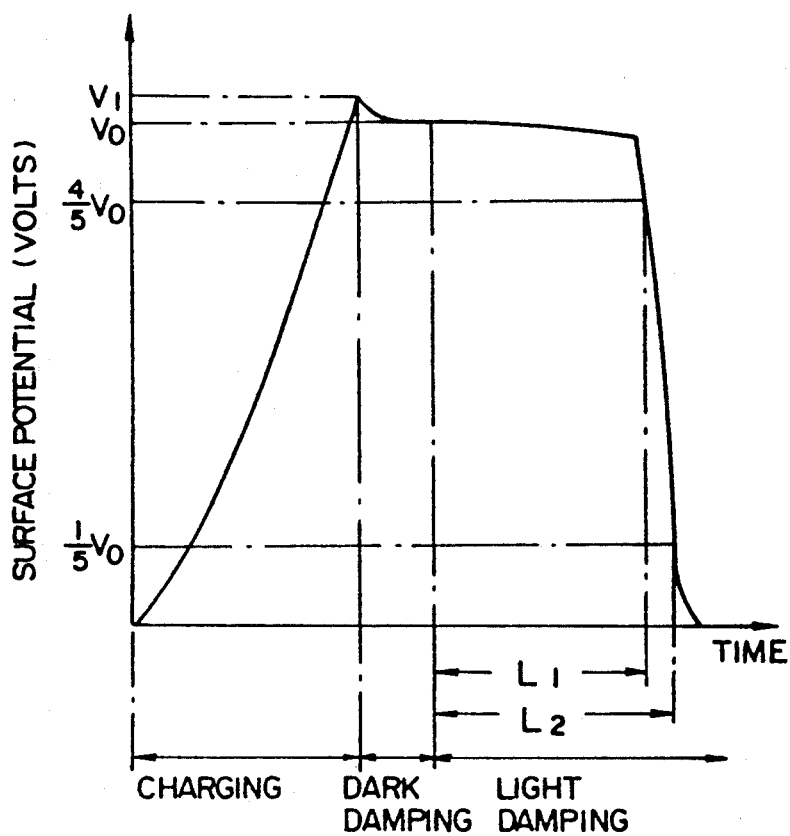
FIG. 3 is a schematic view showing the characteristics of a high-γ type photoreceptor.

FIG. 3 is a schematic view showing the characteristics of a high-$\gamma$ type photoreceptor.

In the drawing, $V_1$ is a charged voltage (volts), $V_0$ is the initial potential prior to exposure (volts), $L_1$ is the required light quantity ($\mu$J/cm$^2$) emitted by a laser beam when the initial potential $V_0$ is 4/5 damped, and $L_2$ is the required light quantity emitted by a laser beam when the initial potential $V_0$ is 1/5 damped.

$L_1/L_2$ is preferably in the range:

$$1.0 \leq L_1/L_2 \leq 1.5.$$

In the present invention, $V_1 = 1000$ (V), $V_0 = 950$ (V), and $L_1/L_2 = 1.2$. The potential of the photoreceptor in the exposure section is 10 V.

When the photosensitivity at a position on the photoreceptor damping curve, corresponding to the middle stages of exposure where the initial potential $V_0$ is damped to $\frac{1}{2}$, is taken as $E_{\frac{1}{2}}$, and when the photosensitivity at a position corresponding to the initial stages of exposure where the initial potential $V_0$ is damped to 9/10 is taken as $E_{9/10}$, the photoconductive semiconductor is selected to give the relationship:

$$(E_{\frac{1}{2}})/(E_{9/10}) \geq 2$$

and preferably, $$(E_1)/(E_{9/10}) \geqq 5.$$

Here, the photosensitivity is defined as the absolute value of the amount of potential reduction with respect to a very small amount of exposure.

In the present invention it was discovered that a special photoreceptor, for example, a photoreceptor to which was applied a photoreceptor support member in the form of a photosensitive layer containing phthalocyanine particles dispersed in a binder resin, has particularly desirable semiconductor characteristics.

Photoconductivity semiconductors used in the present invention are phthalocyanine-type photoconductive pigments as disclosed in Japanese Patent Publications 48-34189, 49-4338, 49-17535, and in Japanese Laid Open Patent Applications 47-30328, 47-30329, 50-38543, and 51-23738.

In the light damping curve of the photoreceptor 1, the absolute value of the differential coefficient of potential characteristics which have a photosensitivity as shown in FIG. 3 becomes small when the amount of light is small, and is steeply damped as the amount of light increases. Specifically, in the early stages of exposure of a light damping curve, as shown in FIG. 3, for a period L1, sensitivity characteristics are poor, and show an almost level trend of damping characteristics, but from L1 to L2 during the middle stages of the exposure there is a complete change to ultrahigh sensitivity, showing ultrahigh-$\gamma$ characteristics with the curve descending in an almost straight line. The photoreceptor 1 specifically utilizes avalanche developing under a high charge of +500 to +2000 V, and is considered to have received high-$\gamma$ characteristics. Specifically, in the initial stages of exposure a carrier originating on the surface of the photoconductive pigment is effectively trapped in the interface layer between the pigment and a covering resin and damping is reliably restrained. As a result, this carrier is released and avalanche developing is produced very suddenly in the middle stages of the exposure.

The developing agents charged into the developing apparatuses 4A, 4B, 4C, and 4D differ only in color. They have a common structure, as shown in FIG. 5, and this structure will now be explained with a developing device 40 as a representative example. The developing device 40 comprises a sleeve 43 which contains a magnet roller 44 with rotatable N and S electrodes installed in a developing tank comprising a lower casing 42 and an upper casing 41; a scraper 45 made from a flexible plate which is pressed against the sleeve 43 by a fixed member 46 secured to the upper casing 41; a first mixing member 47 and a second mixing member 48, which are screw-type mixers; and a sleeve cleaning roller 49. The first mixing member 47 conveys a developing agent D toward the front bottom surface, and the second mixing member 48 conveys the developing agent D toward the back bottom surface. A partition provided between the mixing members 47, 48, is shaped so that the developing agent D does not remain stationary. In place of the scraper 45, a thin layer forming means comprising a magnetic plate and a magnetic rod may be provided.

The sleeve cleaning roll 49, rotating in the direction indicated by the arrow, passes through the developing region and scrapes the developing agent, from which the toner has been consumed, from the sleeve 43. Because of this, the developing agent conveyed to the developing region can be replaced, and the developing conditions are stable.

A developing bias circuit 80 which applies a voltage with a DC bias component through a protective resistance (omitted from the drawing) to prevent fogging is provided on the sleeve 43.

The developing agent D used here is a two-component developer. The toner has a particle diameter of 1 to 20 $\mu$m and is used mixed with small silica particles treated with a charge control agent or an amine compound or other additive agents. If a carrier which comprises the developing agent also has a small particle diameter, in the same manner as the toner, this is advantageous from the aspect of resolution of image quality and gradation reproducing. For example, in the case where the carrier for the developing agent layer has a small particle diameter of 5 to 50 $\mu$m, a magnetic brush of uniform height can be formed.

The toner moves, conveyed by the sleeve, to the developing region on the photoreceptor 1 under an electrostatic force from the developing bias circuit 80 which comprises an AC power source for supplying an AC bias to cause the toner to vibrate between the sleeve 43 and the photoreceptor 1 in this developing region, and a high voltage DC power supply for supplying a DC bias. In this embodiment of the present invention, V DC=800 V, V AC=700 V at 3 KHz. In this manner, because the developing bias circuit 80 creates a vibration field between the sleeve 43 and the photoreceptor 1, the particles of the developing agent vibrate between the sleeve 43 and the photoreceptor 1 so that, even if the developing agent D and the photoreceptor 1 do not come into contact, a toner image is formed on the photoreceptor 1 by means of the toner particles so that the preceding toner image is not damaged.

In non-contact developing, because the developing agent does not touch the latent image, it is difficult to develop a very fine latent image. However, by making a steep latent image by means of a high-$\gamma$ type photoreceptor it is possible to improve the developing characteristics of the small parts by forming a good latent image.

In this manner, the present invention using a high-$\gamma$ type photoreceptor is even more effective, especially with non-contact developing methods, and is not limited to contact developing.

Next, the fabrication of the developing agent used in this embodiment of the present invention will be described.

FORMULATION OF DEVELOPING AGENT

Toner

Polystyrene: 45 parts by weight
Polymethylmethacrylate: 44 parts by weight
Charge control agent: 0.2 to 1.0 parts by weight
Coloring agent: 3 to 15 parts by weight This composition is blended, milled, and pulverized, then classified to obtain a toner with a weight average particle diameter of 3 $\mu$m. Silica is another additive used with the toner. The toner charge is 20$\mu$ c/g.

The following materials can be used to maintain the spectral characteristics and prevent the reduction of the amount of the laser beam from the write-in system from light absorption by the toner.

Benzidine yellow G (C.I. 21090), benzidine yellow GR (C.I. 21100), permanent yellow DHG (manufactured by Hoechst), brilliant carmine 6B (C.I. 15850), rhodamine 6G lake (C.I. 45160), rhodamine B lake (C.I. 45170), phthalocyanine blue non-crystal (C.I. 74160), phthalocyanine green (C.I. 74260), carbon black, fast yellow 5G, fast yellow 3G, fast red G, fast red HRR, fast red 5B, fast black HB, Zapon fast black RE, Zapon fast black B, Zapon fast blue HFL, Zapon fast red BB, Zapon fast red GE, Zapon fast yellow B, Quinacridone red (C.I. 465000).

Carrier (resin coated carrier)

Core: ferrite
Coating resin: styrene acryl (4:6)
Magnetization: 70 emu/g
Weight average particle diameter: 30 μm (globular)
Specific gravity: 5.2 g/cm$^3$
Specific resistance: $>10^{13}\Omega$cm.

A developing agent is obtained by the abovementioned components given in the formulation of the composition.

The configuration of a scanner optical system of a first embodiment of the image forming device 100 of the present invention will now be described, based on FIG. 6, which is an explanatory drawing showing a schematic configuration of the scanner optical system for the first embodiment of the image forming device.

The scanner optical system 3 projects a beam, light modulated by an image signal which modulates the intensity of a density signal by a reference signal, onto the evenly charged peripheral surface of the photoreceptor 1, and forms an electrostatic latent image.

Figure 6:
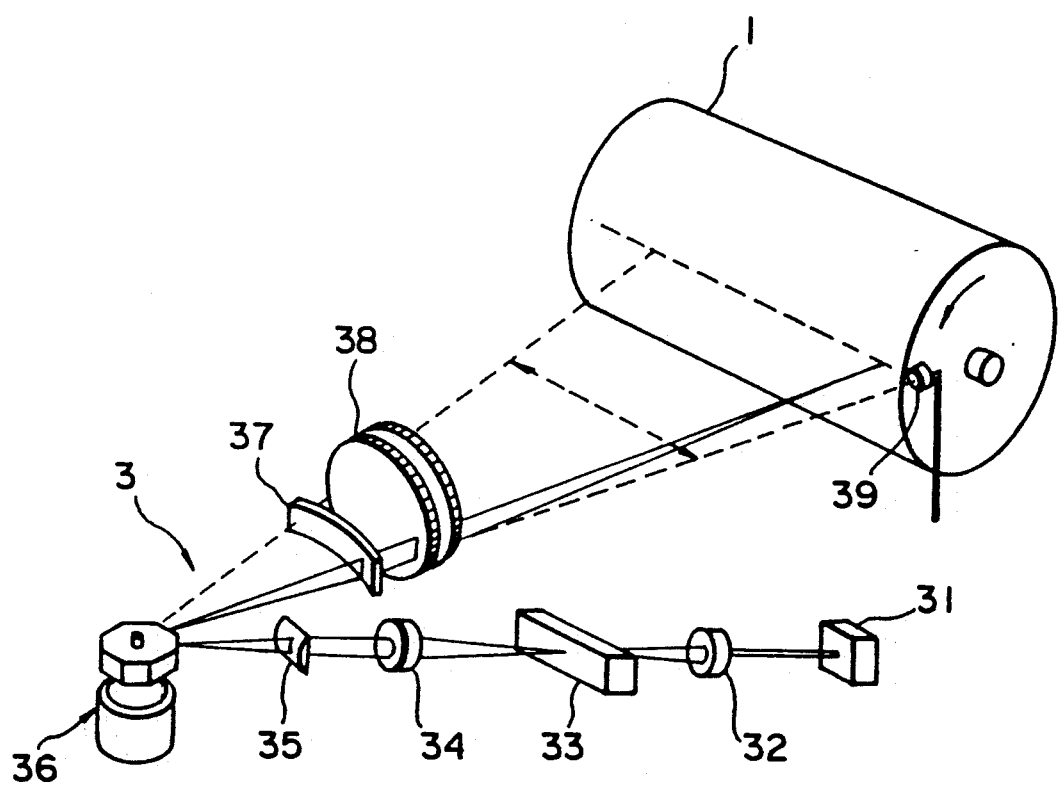
FIG. 6 is an explanatory drawing showing a schematic configuration of a scanner optical system for a first embodiment of an image forming device.

As illustrated in FIG. 6, the scanner optical system 3 comprises a semiconductor laser 31, a beam compressor 32, an acousto-optic modulator (AOM) 33, a beam expander 34, a cylindrical lens 35, a polygon mirror 36, a toroidal lens 37, and an Fθ lens 38.

An index sensor 39 detects the position of the surface of the polygon mirror 36 which rotates at a specified speed, and an optical scanning operation is performed for image data which is modulated, as will be later explained, by periodic scanning in the main scanning direction.

A GaAlAs semiconductor laser or the like is used to sequentially build up a color toner image on the photoreceptor 1, and exposure takes place at an optical wavelength at which absorption by a colored toner is small—in this case, preferably at a beam wavelength of 800 nm.

The beam compressor 32 compresses the diameter of the beam directed onto the AOM 33 to ½, and expands the modulation band. The beam expander 34 expands the diameter of the beam. The polygon lens 36 is a light deflecting system. An assembly comprising the cylindrical lens 35, which will be later described, and the toroidal lens 37 forms a surface inclination compensation optical system for reducing the pitch irregularity from surface inclination errors of the polygon lens 36.

Figure 7:
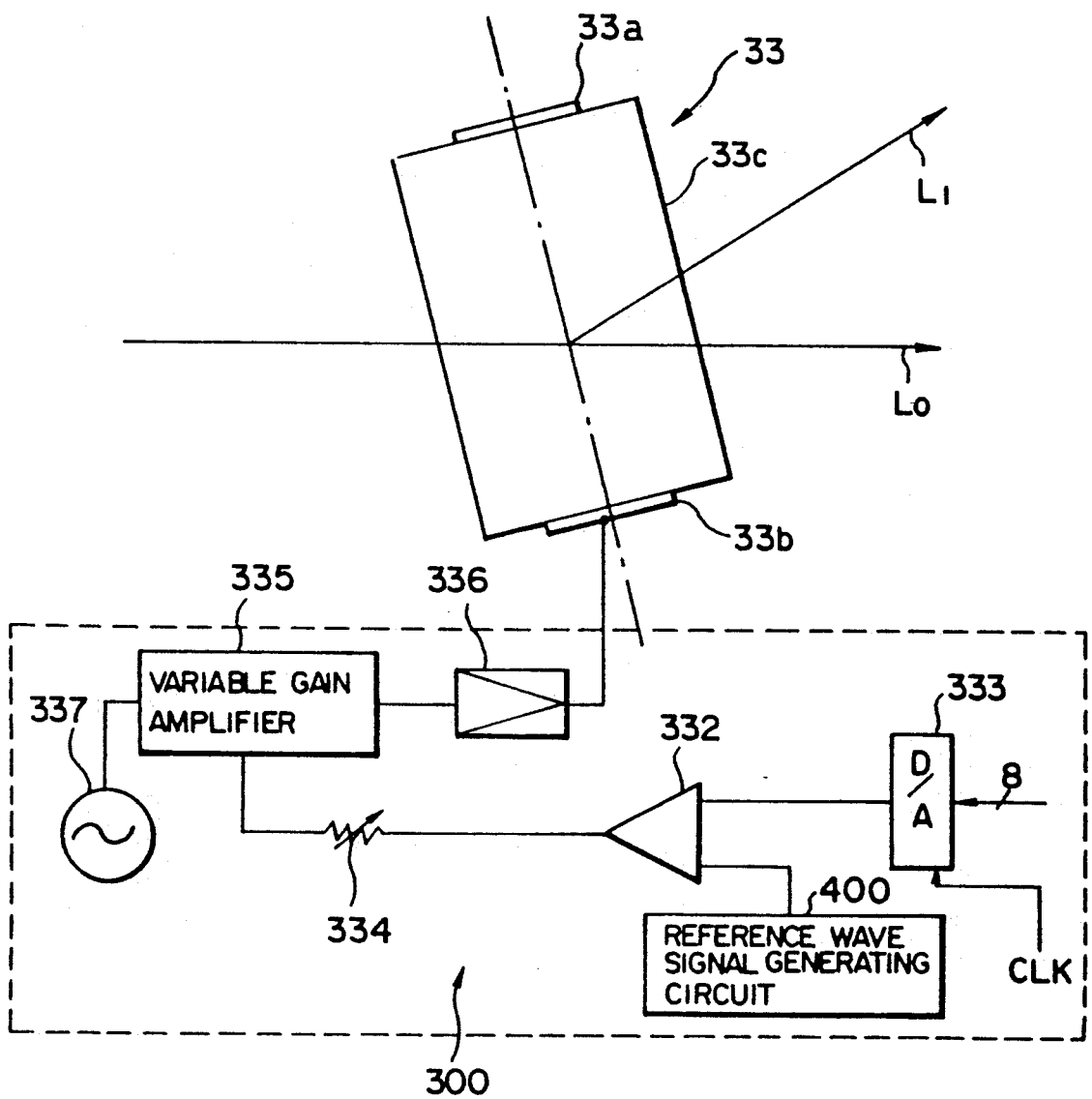
FIG. 7 is a block diagram showing a drive circuit of an acousto-optic modulation device of this embodiment.

FIG. 7 is a block diagram showing a drive circuit for an acousto-optic modulator of this embodiment.

In the diagram, the AOM 33 is an element for converting an electrical signal containing an image signal to a light signal, comprising a piezoelectric element 33c fabricated from heavy flint glass, TiO$_2$, PbMnO$_4$, or the like, and a pair of electrodes 33a, 33b, positioned one one each end of the piezoelectric element 33c.

A drive circuit 300 comprises a reference wave signal generating circuit 400, a differential amplifier 332, a D/A converter 333, a variable resistance 334, a variable gain amplifier 335, a high band power amplifier 336, and a carrier wave generating circuit 337.

In the drive circuit 300, a D/A converted analogue image density signal and a reference signal modulate an 8-bit digital image density signal by the differential amplifier 332, and the modulated signal is input to the variable gain amplifier 335. This signal modulates the amplitude of the carrier wave by the carrier wave generating circuit 337, and a high frequency voltage which amplifies the modulated signal with the high band power amplifier 336 is applied to the electrode 33b.

In the AOM 33, the high frequency voltage is applied to the electrode and an ultrasonic wave generated by the piezoelectric vibration element is propagated. Also, from the photoelasticity effect of the medium, a compressional wave of the ultrasonic wave causes a change in the refractive index. This change in the refractive index brought about by the ultrasonic plays the role of a phase lattice with respect to the incident beam, and the beam input at a black angle on the ultrasonic wave surface is diffracted. Specifically, the AOM 33 performs light modulation by controlling the generation of ultrasonic waves corresponding to the image signal. Here, a primary beam L$_1$ is used as the modulated beam.

Figure 8:
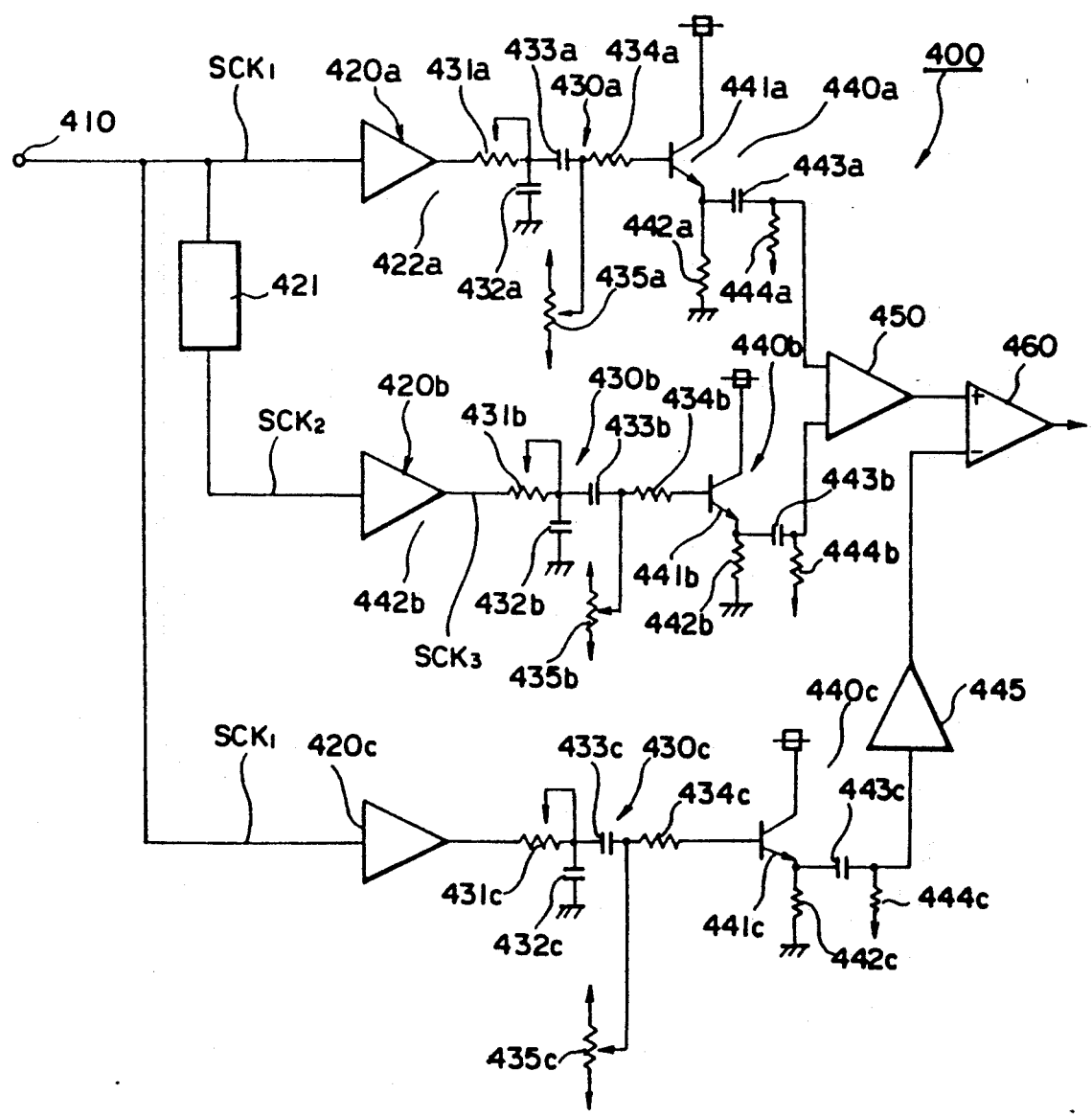
FIG. 8 is a block diagram showing a specific reference wave signal generating circuit of this embodiment.

FIG. 8 is a block diagram showing a reference wave signal generating circuit of this embodiment. FIGS. 9A to 9D illustrate the formation of reference wave signals, and specifically illustrate the action of a reference wave signal generating circuit 400.

The reference wave signal generating circuit 400 comprises a plurality of buffer circuits 420a, 420b, 420c, a plurality of triangular wave generating circuits 430a, 430b, 430c, a plurality of circuits 440a, 440b, 440c, a composite circuit 450, and a differential amplifier circuit 460.

Figures 9A, 9B, 9C, 9D:
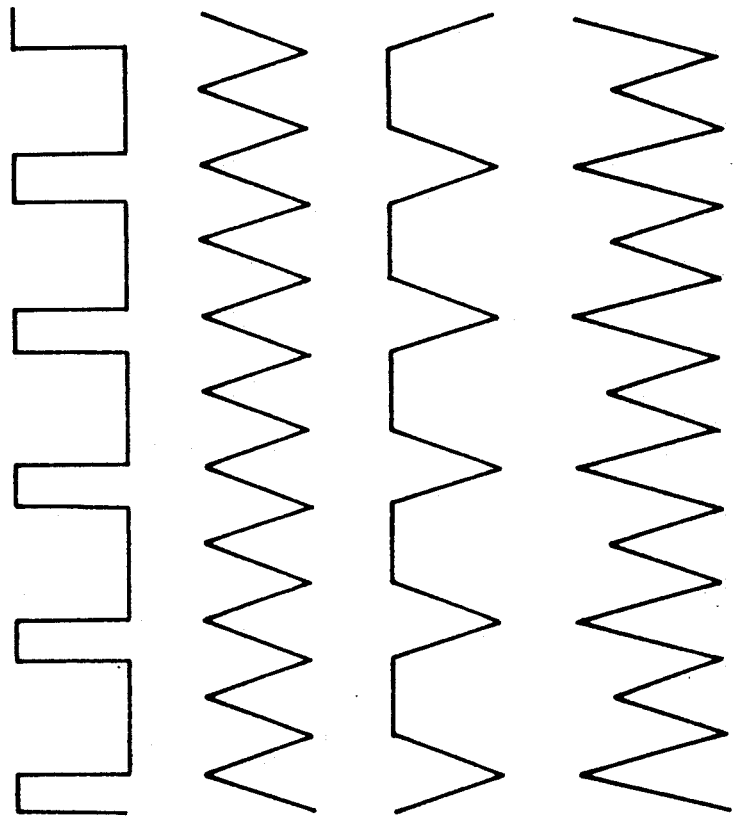
FIGS. 9A to 9D are timing charts showing the formation of reference wave signals.

As an input signal, a standard clock signal CLK is frequency divided and thinned out, then input as a reference wave standard pulse SCK$_1$ (FIG. 9A). The reference wave standard pulse SCK$_1$ is ½ frequency divided, delayed in a delay circuit 421, and output as a reference wave standard pulse SCK$_2$.

The triangular wave generation circuits 430a, 430b, 430c generate triangular waves by means of an integrator comprising a plurality of variable resistances 431a, 431b, 431c and a plurality of capacitors 432a, 432b, 432c. The triangular waves are input to the base terminals of a plurality of transistors 441a, 441b, 441c through a plurality of capacitors 433a, 433b, 433c and a plurality of protective resistances 434a, 434b, 434c. The triangular wave generation circuits 430a, 430b, 430c create the respective waveforms from the reference wave standard pulses SCK$_1$, SCK$_2$, and generate triangular waves. The triangular wave generation circuits 430a, 430b, 430c are each provided with two variable resistances. Specifically, the variable resistances 431a, 431b, 431c are used to adjust the amplitude of the triangular waves, and a plurality of variable resistances 435a, 435b, 435c are used to adjust the bias and the offset of the triangular waves.

The triangular waves output from the triangular wave generation circuits 430a, 430b, 430c are passed through the circuits 440a, 440b, 440c and output.

Composite triangular waves are formed in the composite circuit 450 from the signals output from the circuits 440a, 440b and are output to the differential amplifier circuit 460 for addition and amplification (FIG. 9B).

The integration circuit 430c forms the waveform of the previously described standard clock signal $CLK_1$ and creates a triangular wave. This triangular wave is passed through the circuit 440c then through an inverter 445 (FIG. 9C), after which it is output to the differential amplifier circuit 460. The differential amplifier circuit 460 differentially amplifies the signals shown in FIG. 9B and FIG. 9C to obtain the signals shown in FIG. 9D.

The action of the first embodiment of the image forming device 100 will now be explained.

FIGS. 10A to 10F are timing charts for explaining the image forming process of the image forming device 100 when the reference signal is a first triangular wave.

FIG. 10A shows a recorded picture element clock DCK. FIG. 10B is an analogue density signal showing the density of a D/A converted image after color and gradation correction. In order to show the efficiency of gradation reproduction by the reference wave, the case is shown in which the density signal is changed every two picture elements. The solid line in FIG. 10C is the reference wave signal from the reference wave signal generating circuit 400. The period of the reference wave signal is double that of the picture element clock DCK. The relationship between the density signals in FIG. 10C and FIG. 10B (the broken line in FIG. 10C) and the reference wave signal from the reference wave signal generating circuit 400 (the solid line in the drawings) is shown. FIG. 10D shows a modulating signal obtained by comparison of the analogue density signal with the reference wave signal, that is the output signal from the differential amplifier 332 shown in FIG. 7. This modulation is performed in synchronism with the density signal corresponding to the recorded picture element and the reference wave signal. Then, the exposure distribution on the photoreceptor 1 formed by applying to the AOM 33 a high frequency voltage, which is amplitude modulated by the modulation signal, and modulating the beam is shown in FIG. 10E. Accordingly, the exposure distribution is the result of the MTF of the optical system on the amount of light generated. The exposed dot distribution is expanded more than the signal shown in FIG. 10D because of the lack of sharpness of the optical system. The portion of light greater than about the half-value of the amount of light required for exposure by the photoreceptor is formed from the high γ photoreceptor characteristics as a latent image on the half-value of the photoreceptor potential $V_0$ shown as the broken line in the exposure distribution in FIG. 10E. A dotted latent image equivalent in magnitude to the density signal is obtained. FIG. 10F shows the image intensity distribution of the dots formed by developing the latent image. Using a reference wave signal with multiple peaks, half-tone reproduction is further improved and an extremely high quality image is obtained.

With the present invention it is possible to easily switch gradation characteristics and resolution to conform to the printed detail. Specifically, it is possible to make adjustments to conform to the image by continuously varying the magnitude of the triangular waves. Therefore, when the amplitude of the reference wave is also changed, the gradation can be changed. In addition, it is possible to change the density together with a shift in the DC component of the reference wave. Also, when only the amplitude is changed, for example, when the difference in amplitude is large, an image with improved gradation characteristics is obtained. If the amplitudes are the same, an image with a preferred resolution is obtained.

The image forming process of the digital image forming device of the present invention will now be explained.

The image is exposed by a beam of light from the scanner optical system 3 and an electrostatic latent image is formed on the drum-shaped photoreceptor, corresponding to the various colors. Among these electrostatic latent images, the electrostatic latent image corresponding to the color yellow is formed by the application of a laser beam which is light modulated by the yellow data (digital density data). The electrostatic latent image corresponding to the color yellow is developed by the first developing apparatus 4A and a first dotted toner image (yellow toner image) of extremely high clarity is formed on the photoreceptor 1. A charge is once more applied to the photoreceptor 1 by the scorotron charging apparatus 2 without transferring the first toner image onto a printing paper P.

Next, the laser beam is light modulated by the magenta data (digital density data), and the modulated laser beam is directed onto the photoreceptor 1 to form an electrostatic latent image. This electrostatic latent image is developed by the second developing apparatus 4B and a second toner image (magenta toner image) is formed. Then, in the same manner as previously described, the next developing step is carried out by the third developing apparatus 4C and a third toner image (cyan toner image) is formed, so that these three color toner images are formed in successive layers on the photoreceptor 1. Finally, a fourth toner image (black toner image) is formed so that there are four color toner images formed in successive layers on the photoreceptor 1.

The photoreceptor of the image forming device 100 of this embodiment has superior high γ characteristics. Furthermore, even when toner images are repeatedly superimposed on these toner images with superior high γ characteristics by performing the charging, exposing, and developing processes many times, a stable latent image is formed. Specifically, a dotted electrostatic latent image of high clarity and without fringes can be formed by shining a beam on a toner image, based on a digital signal. As a result, a high clarity toner image can be obtained.

This four-color toner image is transferred onto the recording paper P supplied from a paper supply device, using the transfer apparatus 62, after the photoreceptor 1 is charged by the charging apparatus 61 (although this charging step can be omitted).

The recording paper P bearing the transferred toner image is separated from the photoreceptor 1 by the separating apparatus 63, is conveyed by a guide and conveyor belt, supplied to the fixing roller 64 where it is fixed by the application of heat, then discharged to a paper discharge tray.

After the transfer from the photoreceptor 1 has been completed, toner remaining on the surface of the photoreceptor 1 is removed by a blade, fur brush, or magnetic brush on the cleaning device 70 which is inactivated during toner image formation. The charge is removed by a lamp, which is not used during toner image formation, or by the corona neutralization apparatus 74 so there are no obtacles to the formation of the next multicolored image. The lamp or neutralization apparatus 74 may be installed immediately before cleaning.

In the explanation of this embodiment, the use of intensity modulation by the AOM was described, but almost the same effect can be obtained from direct intensity modulation by means of a modulating signal (FIG. 10D) using a semiconductor laser or an LED array. The modulating signal in this case is formed by the differential amplifier 332.

As another example of a reference wave, an image with gradation of high clarity can be obtained in the same manner by selection of two triangular waves in one period of a magnitude in agreement with a period four times that of the recorded picture element. In addition, in the case where identical triangular waves are used (where one period is twice the recorded picture element period) a clear image with high resolution is obtained.

Generally, with a high-$\gamma$ photoreceptor image reproduction tends to exhibit contrast, and having multiple peaks in one period of the reference wave is effective in improving gradation.

A second embodiment of the image forming device of the present invention will now be described.

Figure 11:
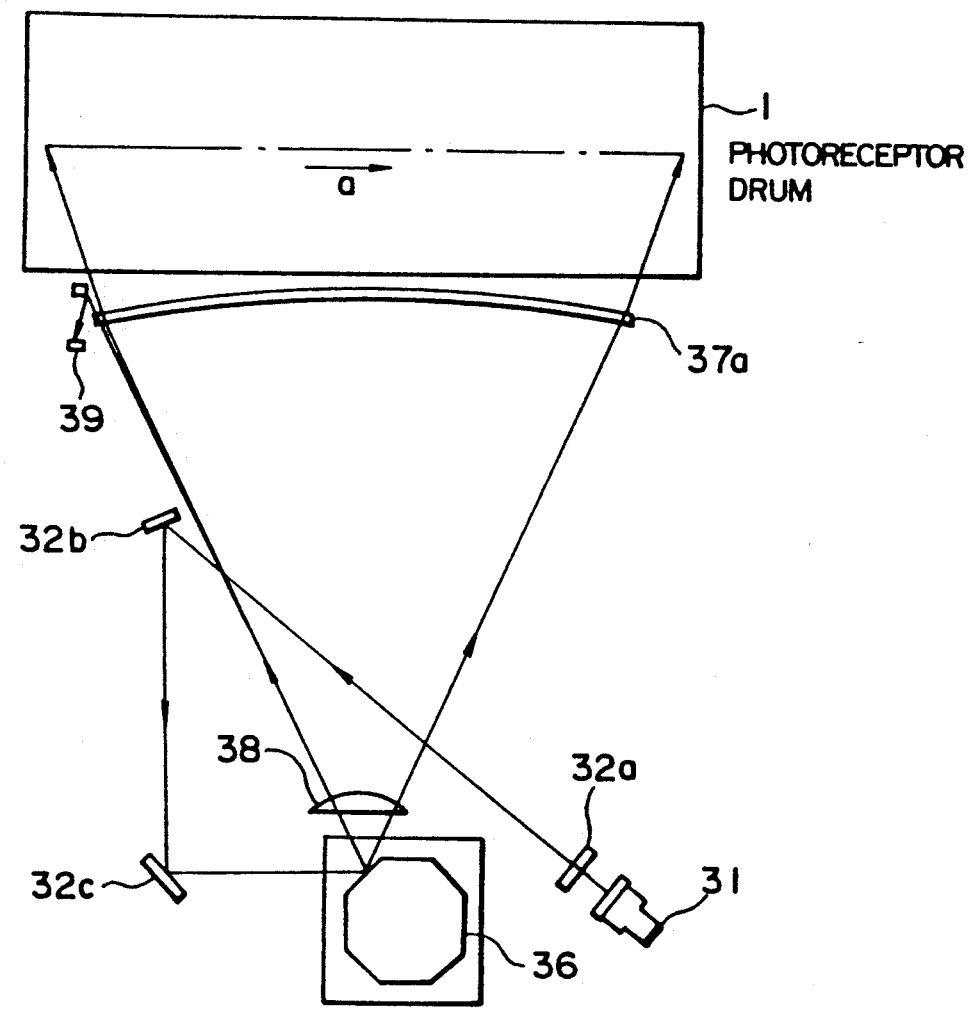
FIG. 11 is an explanatory drawing showing a schematic configuration of a scanner optical system for a second embodiment of an image forming device.
Figure 12:
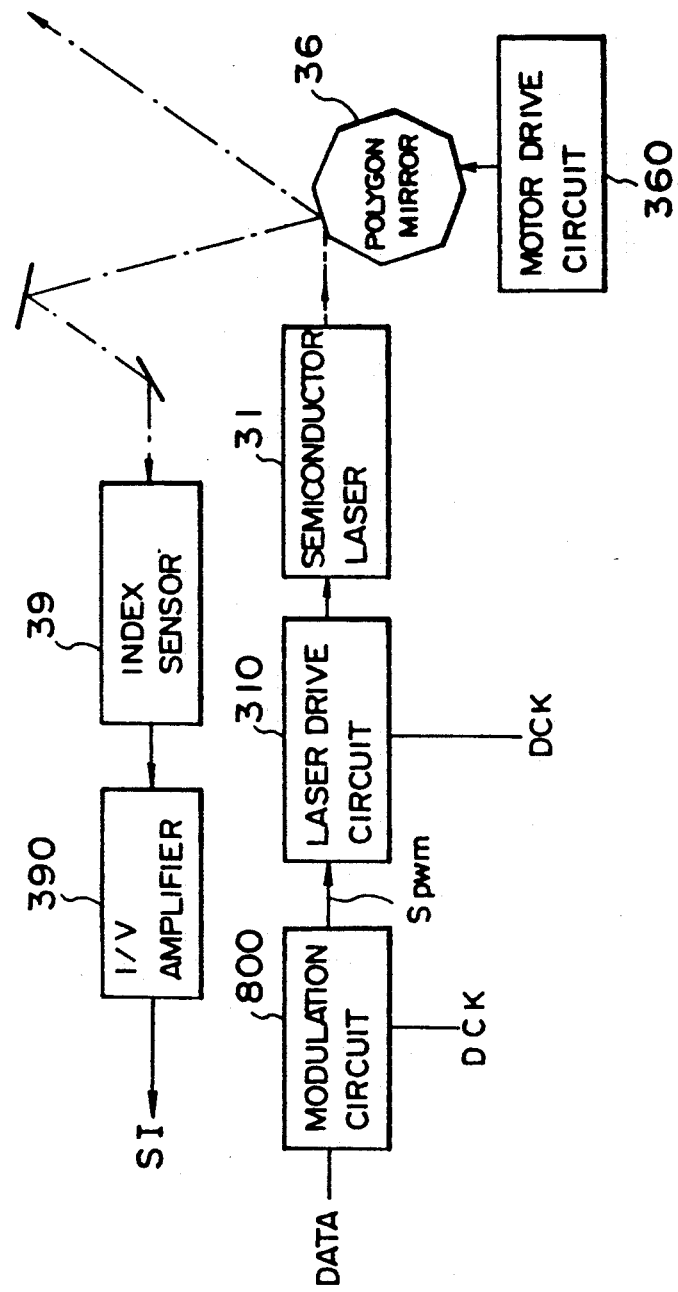
FIG. 12 is a block diagram showing a drive circuit of this scanner optical system.

FIG. 11 is a block diagram for explaining the schematic configuration of the scanner optical system for a second embodiment of the image forming device. FIG. 12 is a block diagram showing a drive circuit of this scanner optical system.

Except for the scanner optical system and the drive circuit, the image forming device has a configuration identical to that of the image forming device 100. An image is recorded on the photoreceptor 1 by an elliptical beam based on a specified bit digital image density signal.

As shown in FIG. 11, the scanner optical system comprises a plurality of mirrors 32a, 32b, 32c, the polygon mirror 36, the F$\theta$ lens 38, an inclination correction lens 37a for correcting inclination of the polygon lens 36, and the index sensor 39. Reference numbers in these drawings indicated parts which correspond in function to the parts indicated by the same reference numbers in FIG. 6.

The drive circuit of the scanner optical system, as shown in FIG. 12, comprises a modulation circuit 800 which forms a pulse width modulation signal $S_{pwm}$ based on an image density signal (image density data) from a computer or a scanner, and a laser drive circuit 310 which drives a semiconductor laser 31 by the pulse width modulation signal $S_{pwm}$. The laser drive circuit 310 is driven so that a signal corresponding to the amount of light in the beam from the semiconductor laser 31 is fed back, and this amount of light is set. The drive circuit of the scanner optical system further comprises a current/voltage conversion amplifier 390 which converts a signal from the index sensor 34 to a voltage signal to form an index signal, and a motor drive circuit 360 which rotates the polygon mirror 36 at a specified speed.

Figure 13:
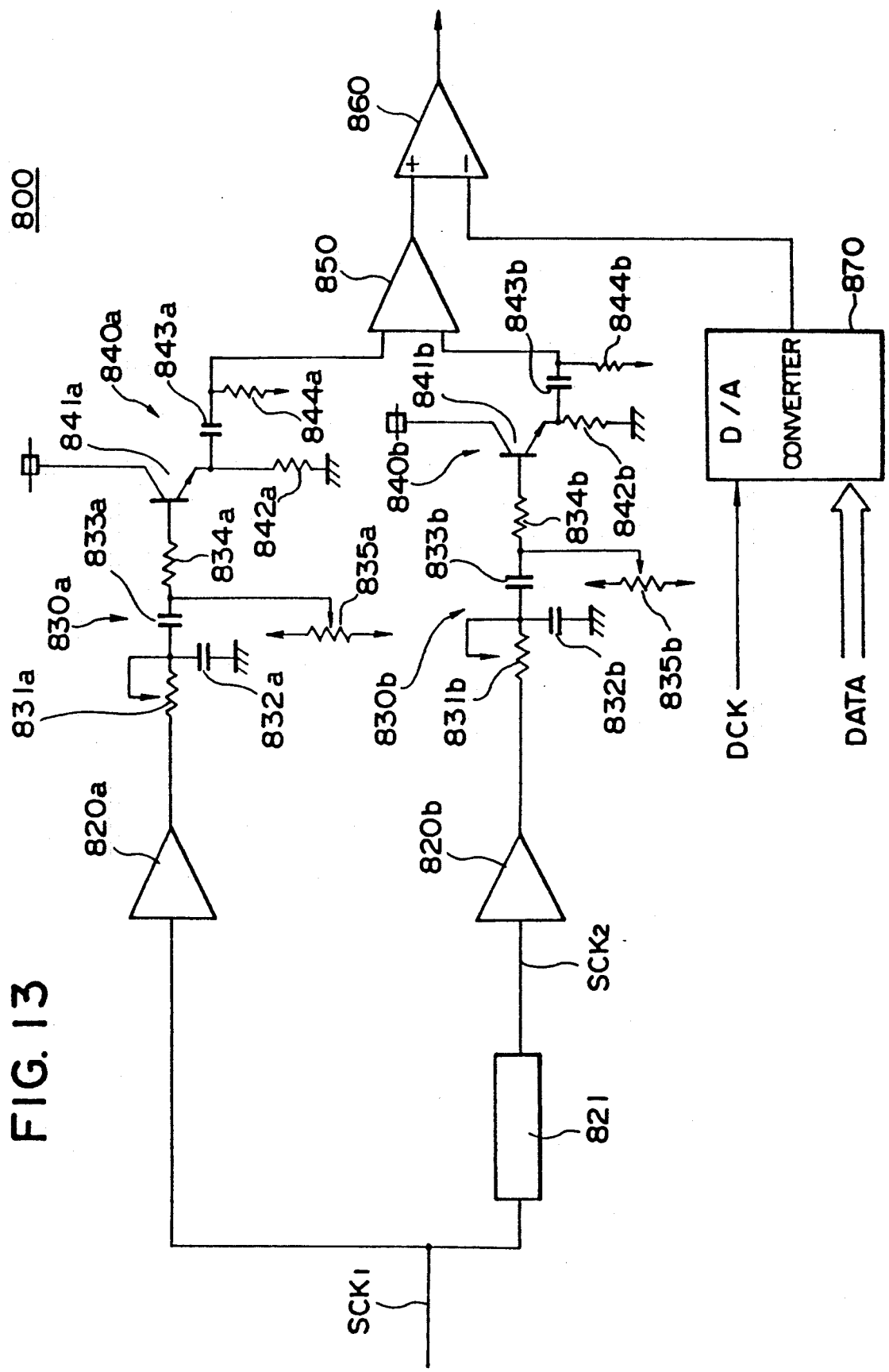
FIG. 13 is a block diagram showing one example of a modulation circuit.

FIG. 13 is a block diagram showing one example of a modulation circuit.

The modulation circuit 800 comprises a pair of buffer circuits 820a, 820b, a pair of triangular wave generating circuits 830a, 830b, a pair of circuits 840a, 840b, a differential amplifier circuit 850, a comparator 860, and a D/A converter 870.

As an input signal, after a standard pulse CLK is frequency divided, a reference wave standard pulse SCK$_1$ formed from the thinned out pulse is output in the same manner. A delay circuit 821 outputs a reference wave standard pulse SCK$_2$ which is the reference wave standard pulse SCK$_1$ shifted half a period.

A pair of triangular wave generating circuits 830a, 830b generate triangular waves by means of an integrator comprising a pair of variable resistances 831a, 831b and a pair of capacitors 832a, 832b. In addition, the triangular waves are input to the base terminals of a pair of transistors 821a, 821b through a pair of capacitors 833a, 833b and a pair of protective resistances 834a, 834b.

The triangular wave generation circuits 830a, 830b create the respective waveforms of the reference wave standard pulses SCK$_1$, SCK$_2$, and generate triangular waves. The triangular wave generation circuits 830a, 830b are each provided with two variable resistances. Specifically, the variable resistances 831a, 831b are used to adjust the amplitude of the triangular waves. A pair of variable resistances 835a, 835b are used to adjust the bias and the offset of the triangular waves.

The triangular waves which are input from the triangular wave generation circuits 830a, 830b are passed through the circuits 840a, 840b and output.

In the composite circuit 850, the signals output from the circuits 840a, 840b are added and amplified, and triangular waves are output to the comparator 860.

An 8-bit digital image density signal is output to the comparator 860 as an analogue density signal after D/A conversion by the D/A converter 870 based on the picture element clock DCK and is output from the comparator 860 as a pulse width modulated signal which has been synchronized in the picture element clock DCK and binary coded. This signal becomes a drive signal which drives the semiconductor laser 31 on and off.

The action of the second embodiment of the image forming device will now be explained.

FIGS. 14A to 14F are timing charts for explaining the action of the scanner optical circuit of the image forming device when the reference signal is a second triangular wave.

FIG. 14A shows a picture element clock DCK. FIG. 14B is an analogue density signal which has been D/A converted after color and gradation correction. The signal represented by the dotted line in FIG. 14C is the analog density signal showing the shading of the D/A converted image, and the signal represented by the solid line is a reference wave signal output from the composite circuit 850. FIG. 14D is a pulse width modulated signal which has been binary converted by the comparator 860. A density signal corresponding to the image density and the reference signal are synchronized, and a pulse width signal corresponding to the image density is created. FIG. 14E shows the exposed dot distribution on the photoreceptor 1. Specifically, the exposed dot distribution is spread because of the lack of sharpness of the scanner optical system. However, the portion of light greater than about the half-value of the amount of light required for exposure shown as the broken line in this exposed dot distribution is formed as a latent image from the high-$\gamma$ photoreceptor characteristics. FIG. 14F shows the shape of the dots in the image density distribution when the latent image is obtained from various sizes of dots corresponding to the density signals, and the dots are formed by developing the latent image. With the analogue density signal which is pulse width modulated by a reference signal with multiple peaks, half-tone reproduction is further improved and an extremely high quality image is obtained from the photoreceptor.

In the case where two triangular waves with a period twice that of the recorded picture element are selected as a reference wave, an image with gradation of high clarity can be obtained. In addition, in the case where identical triangular waves are used (where one period is twice the recorded picture element period) a clear image with high resolution is obtained.

With a high-γ photoreceptor, image reproduction tends to exhibit contrast, and having multiple peaks in one period of the reference wave is effective in improving gradation.

In addition, it is also possible to have the period of the reference wave larger than the recorded picture element period. For example, desirable results are obtained in the same manner with a period which is four times the recorded picture element period.

This embodiment was explained with reference to pulse width modulation using a semiconductor laser, but the present invention is not limited to such an embodiment. The same effect can be obtained with light modulation by a density signal which is pulse width modulated in the same manner using another light generating element such as an LED array.

COMPARATIVE EXAMPLE

Comparative Photoreceptor Example

A Se-Te layer was formed on an aluminum substrate to a depth of 70 μm using vacuum evaporation to prepare a sample photoreceptor. The Te density is higher in the upper layer and is about 30%. Te also has a spectral sensitivity to infrared rays so that the spectral sensitivity is increased.

The charge potential was 950 V, and the dark damping ratio 20%. In addition, the photosensitivity ratio was $(E_{\frac{1}{2}})/(E_{9/10})=0.8$, $L_2/L_1=6$, and the spectral sensitivity in the high potential range was high.

When color images were formed under the same conditions as the embodiment, using the comparative photoreceptor, the images were unstable and unclear with the reproduction spot diameter expanded, in comparison with the images obtained with the embodiment.

This is believed to be because the latent image was formed at a low density exposure, and because the temperature of the photoreceptor and the photoreceptor characteristics worsened with repeated use. Also, it was not possible to form a stable toner image on the preceding toner image.

A stable potential pattern was not formed because of the fact that the formation of the latent image varied as a result of the fluctuation in the amount of toner adhering caused by the shielding effect of the preceding toner image. During periods of low exposure because of changes in the exposure intensity of the beam, toner image formation was unsatisfactory, and when the exposure was strong the dot diameter decreased and a drop in the resolution was observed so that an adequate image was not obtained.

As discussed in the above explanation, by the present invention it is possible to provide an image forming device which can form an image with good resolution or stable gradation reproduction with good clarity, specifically, which can form an image with faithful half-tone reproduction from dots, and with high resolution, because of the fact that exposure modulation is carried out based on the modulation signal obtained by comparing the image density signal and the reference wave signal, and the reference wave signal has multiple peaks in one period, corresponding to the type of image.

Also, in an image forming device by which an electrostatic latent image is formed as dots on a photoreceptor by the light modulated laser beam from an acousto-optic modulation device on which a high voltage is impressed and reversal reproduction is carried out, light damping characteristics are provided by which the potential of the photoreceptor is not damped in the initial stages of exposure, but is steeply damped in the middle stages of exposure. With the high frequency voltage, the use of the image density signal as a signal modulated by a reference wave signal with multiple peaks in the same period makes it possible to produce an image with good resolution or stable gradation reproduction with good clarity corresponding to the type of image, in a uniform print. Specifically, it is possible to provide an image forming device which can form an image with good resolution or stable gradation reproduction with good clarity, specifically, which can form an image with faithful half-tone reproduction from dots, and with high resolution.

In the present invention by which an electrostatic latent image is formed as dots on a photoreceptor by a beam which is intensity modulated by a modulation signal and reversal reproduction is carried out, light damping characteristics are provided by which the potential of the photoreceptor is not damped in the initial stages of exposure, but is steeply damped in the middle stages of exposure. With the abovementioned modulating signal, the use of the image density signal as a signal modulated by a reference wave signal with multiple peaks in the same period makes it possible to produce an image with good resolution or stable gradation reproduction with good clarity corresponding to the type of image, in a uniform print. Specifically, it is possible to provide an image forming device which can form an image with good resolution or stable gradation reproduction with good clarity, specifically, which can form an image with faithful half-tone reproduction from dots, and with high resolution.

In the present invention by which an electrostatic latent image is formed as dots on a photoreceptor by a beam which is modulated by a modulating signal obtained from a comparison of an image density signal and a reference wave signal in a comparator, and reversal reproduction is carried out, light damping characteristics are provided by which the potential of the photoreceptor is not damped in the initial stages of exposure, but is steeply damped in the middle stages of exposure. The use of a reference signal with multiple peaks in the same period makes it possible to produce an image with good resolution or stable gradation reproduction with good clarity corresponding to the type of image, in a uniform print. Specifically, it is possible to provide an image forming device which can form an image with good resolution or stable gradation reproduction with good clarity, specifically, which can form an image with faithful half-tone reproduction from dots, and with high resolution.

In addition, by independently varying the peak value of the reference wave signal in the present invention, an image forming device which forms an image with good clarity and high resolution can be provided.

Next, the potential distribution on the electrostatic latent image and the dot image density distribution when a third triangular wave is used as the reference wave signal will be explained with reference to FIGS. 15A to 15E.

FIG. 15A illustrates an analogue density signal for 256 gradations showing the shading of a D/A converted image after gradation correction of a parallel 8-bit density signal transmitted at 4 MHz. Here, a large output corresponds to a light image. FIG. 15B shows a 4 MHz reference wave signal from the reference wave signal generating circuit 400. FIG. 15C shows an output signal from the differential amplifier 332, specifically, a density signal which is intensity modulated by the addition of the reference wave signal and the density signal. This modulation is performed for the density signal corresponding to the recorded picture element and the reference wave signal synchronized at 4 MHz. FIG. 15D shows the exposure distribution on the photoreceptor 1 formed by a beam modulated by amplitude modulation of a carrier wave by means of the abovementioned density signal and impression of a high frequency voltage amplified in the high band. The main scan and auxiliary scan for the write-in density are 16 dots/mm. The exposed dot distribution as the result of blurring of the optical system from the density signal shown in FIG. 15C is slightly expanded. The exposed portion greater than the fixed amount of light shown as the horizontal line in this exposure distribution is formed as a latent image from the high-$\gamma$ photoreceptor characteristics. FIG. 15E shows the latent images for various sized dots corresponding to the density signals. By developing these latent images extremely high quality images are obtained by the conversion of the various dot shapes to image densities.

The images are exposed by the beam from the exposure device 3, and and electrostatic latent images are formed on the drum-shaped photoreceptor, corresponding to the various colors. Among these electrostatic latent images, the electrostatic latent image corresponding to the color yellow is formed by the application of a laser beam which is light modulated by the yellow data (digital density data). The electrostatic latent images corresponding to the color yellow are various sizes of dots of a write-in density of 16 dots/mm and 256 gradations. These latent images are developed by the first developing apparatus 4A and a plurality of first dotted toner images (yellow toner images) of extremely high clarity is formed on the photoreceptor 1. A charge is once more applied to the photoreceptor 1 by the scorotron charging apparatus 2 without transferring the first toner images onto a printing paper P.

Next, the laser beam is light modulated by the magenta data (digital density data), and the modulated laser beam is directed onto the photoreceptor 1 to form the electrostatic latent images in the same manner. These electrostatic latent images are developed by the second developing apparatus 4B and a plurality of second toner images (magenta toner images) is formed. Then, in the same manner as previously described, the next developing step is carried out by the third developing apparatus 4C and a plurality of third toner images (cyan toner images) is formed, so that these three color toner images are formed in successive layers on the photoreceptor 1. Finally, a fourth toner image (black toner image) is formed so that there are four color toner images formed in successive layers on the photoreceptor 1. Each of these toner images is formed from various sizes of dots of a write-in density of 16 dots/mm and 256 gradations.

The photoreceptor of the image forming device 100 of this embodiment has superior high-$\gamma$ characteristics. Furthermore, even when toner images are repeatedly superimposed on these toner images with superior high-$\gamma$ characteristics by performing the charging, exposing, and developing processes many times, a stable latent image is formed. Specifically, a dotted electrostatic latent image of high clarity and without fringes can be formed by shining a beam on a toner image, based on a digital signal. As a result, a high clarity toner image can be obtained.

This four-color toner image is transferred onto the recording paper P supplied from a paper supply device, using the transfer apparatus 62, after the photoreceptor 1 is charged by the pre-charging apparatus 61 (although this pre-charging step can be omitted).

The recording paper P bearing the transferred toner images is separated from the photoreceptor 1 by the separating apparatus 63, is conveyed by a guide and conveyor belt, supplied to the fixing roller 64 where it is fixed by the application of heat, then discharged to a paper discharge tray.

After the transfer from the photoreceptor 1 has been completed, the toner remaining on the surface of the photoreceptor 1 is removed by a fur brush 72 on the cleaning device 70 which is inactivated during toner image formation. The charge is removed by the neutralization apparatus 74 which is a lamp or a corona neutralization apparatus which is not used during toner image formation, and the next multicolored image is formed. The neutralization apparatus 74 may be installed immediately before cleaning.

FIGS. 16A to 16E are schematic views showing the potential distribution of the electrostatic latent image and the dot image density distribution when the reference wave signal is a fourth triangular wave.

FIG. 16A illustrates a D/A converted analogue density signal showing the shading of the image. FIG. 16B shows a 4 MHz reference wave signal from the reference wave signal generating circuit 400. FIG. 16C shows an intensity modulated density signal which is output from the differential amplifier 332. FIG. 16D shows the exposure distribution on the photoreceptor 1 formed by amplitude modulation of a 160 MHz carrier wave and a beam modulated by the impression of a high frequency voltage after high band amplification. The main scan and auxiliary scan for the write-in density are 16 dots/mm. The exposed dot distribution is slightly expanded as the result of the lack of sharpness of the optical system from the signal shown in FIG. 16C. The exposed portion greater than the fixed amount of light shown as the horizontal line in this exposure distribution is formed as a latent image from the high-$\gamma$ photoreceptor characteristics. FIG. 16E shows the latent images for various sized dots corresponding to the density signals. The image density distribution for various sizes of dots is obtained by developing these latent images. A density signal which is intensity modulated by using a slender, triangular reference wave signal compensates for the dot expansion caused by the MTF of the write-in system, and a narrowing effect is produced.

Next, the case will be shown where the reference wave signal is synchronized with multiple picture elements in the main scanning direction.

FIGS. 17A to 17E are schematic views showing the potential distribution and the dot image density distribution of the electrostatic latent image when the reference signal is a fifth triangular wave. The period of the reference wave signal is taken as units of two picture elements in the main scanning direction, and because this is the same period as the density signal, the resolution in the auxiliary scanning direction is unchanged at 16 dots/min, but the resolution in the main scanning direction is essentially one half at 8 dots/mm. In this case also, the 8 bits of image data is light modulated in the same way.

FIG. 17A illustrates a 4 MHz analogue density signal showing the shading of a D/A converted image of an 8-bit image density signal after gradation correction corresponding to the circuit characteristics of the scanner and printer FIG. 17B shows a 2 MHz triangular reference wave signal from the reference wave signal generating circuit 331. FIG. 17C shows an output signal from the differential amplifier 332, specifically, a density signal which is intensity modulated by the addition of the reference wave signal and the density signal. FIG. 17D shows the exposure distribution on the photoreceptor 1 formed by a beam modulated by the impression of a high frequency voltage after amplitude modulation and high band amplification of a 160 MHz carrier wave. The exposed dot distribution is slightly expanded as the result of blurring of the optical system from the signal shown in FIG. 17C. The exposed portion greater than the fixed amount of light shown as the horizontal line in this exposure distribution is formed as a latent image from the high-γ photoreceptor characteristics. FIG. 17E shows the latent images for various sized dots corresponding to the intensity-modified density signal. The image density distribution of the dot shapes is formed by developing these latent images. This embodiment provides a further improvement in half-tone reproduction.

Regarding the embodiment using the abovementioned third triangular reference wave signal, reference should be made to the previously-discussed comparative example:

As explained above, in the digital image forming device of the present invention by which an electrostatic latent image is formed as dots on a photoreceptor by the light modulated laser beam from an acousto-optic modulation device on which a high voltage is impressed and reversal reproduction is carried out, light damping characteristics are provided by which the potential of the photoreceptor is not damped in the initial stages of exposure, but is steeply damped in the middle stages of exposure. With the high frequency voltage, the use of the image density signal as a signal modulated by a reference wave signal makes it possible to produce a stable image with good clarity. Specifically, it is possible to provide a good digital image forming device which can present the half-tone of the dots by modulating the area of the dots.

In addition, if phthalocyanine is contained in the photoconductive semiconductor powder on the photoreceptor, steep damping is obtained in the intermediate stages of exposure and an image with good clarity can be obtained.

Furthermore, in the digital image forming device of the present invention, the charging, latent image forming, and developing processes are repeated, and the toner images are formed in successive layers on the photoreceptor, and color images of high quality can be obtained.

The electrostatic latent images formed on the photoreceptor are developed by non-contact methods, and even with non-contact developing the formation of clear electrostatic latent images is particularly effective so that images of high quality can be obtained.

Figure 18:
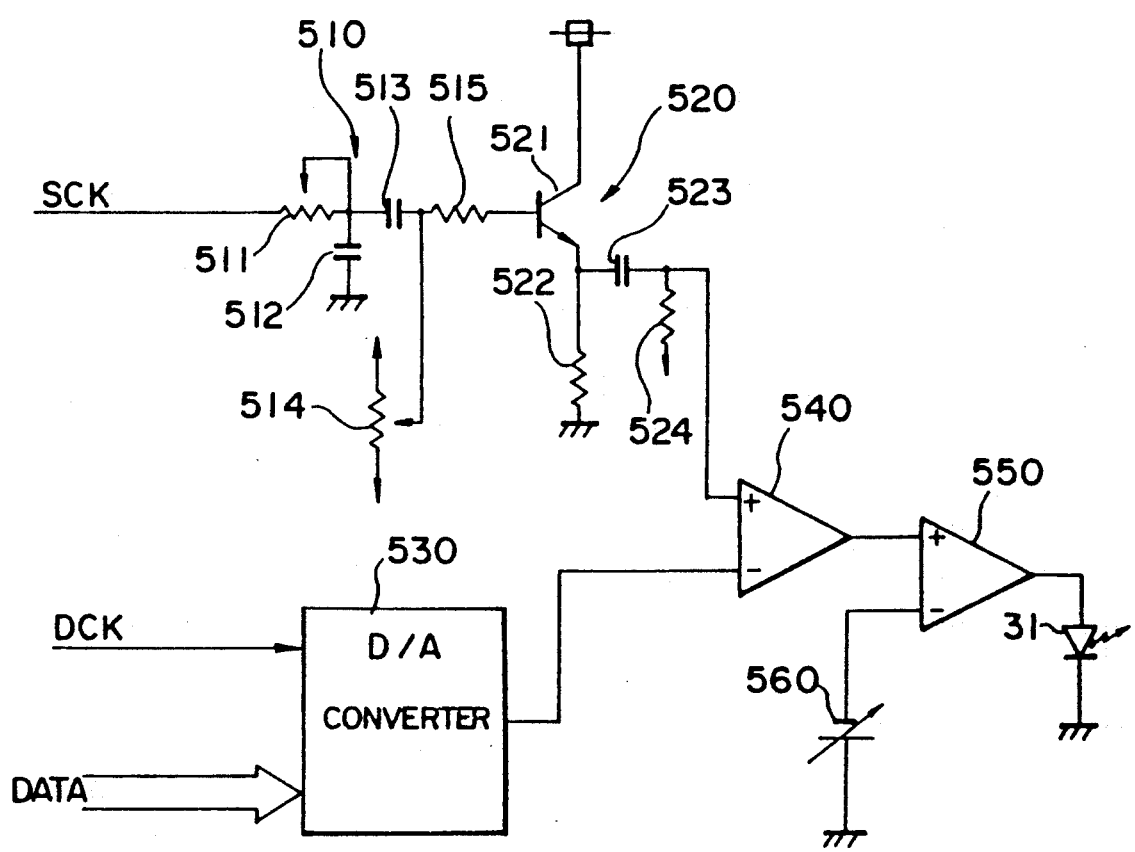
FIG. 18 is a block diagram showing a first embodiment of a drive circuit of the scanner optical system of the image forming device of the present invention.

FIG. 18 is a block diagram showing a first drive circuit of the scanner optical system of the image forming device of the present invention.

A drive circuit 500 of the scanner optical system 3, as shown in FIG. 18, forms an intensity-modulated signal based on an image density signal (image density data) from a computer or a scanner, and drives the semiconductor laser 31 (see FIG. 6) with this modulated signal. The laser drive circuit 500 is provided with a means for feeding back a signal corresponding to the amount of light in the beam from the laser 31, but it is also acceptable if the circuit drives so that this amount of light is constant.

As illustrated in FIG. 18, the drive circuit 500 comprises a reference wave signal generating circuit 510, a buffer circuit 520, a pair of differential amplifier circuits 540, 550, a variable DC power source 560, and a D/A converter 530.

The reference wave signal generating circuit 510 generates a triangular wave by means of an integrator comprising a variable resistance 511 and a capacitor 512. The triangular waves are input to the base terminal of a transistor 521 through a capacitor 513 and a protective resistance 515. The reference wave generation circuit 510 is provided with two variable resistances. Specifically, the variable resistance 511 is used to adjust the amplitude of the triangular waves. A variable resistance 514 is used to adjust the bias and the offset of the triangular waves.

The triangular waves are passed through the buffer circuit 520 and input to the positive input terminal of the differential amplifier circuit 540.

The differential amplifier circuit 540 differentially amplifies the reference wave which has passed through the buffer circuit 520 and an analogue density signal from a fixed bit, for example, an 8-bit digital image density signal which is D/A converted in the D/A converter 530. Then the resulting intensity-modulated signal is output from the differential amplifier circuit 540 to the input terminal of the differential amplifier circuit 550.

The negative input terminal of the differential amplifier circuit 550 is supplied with the output from the variable DC power source 560. The differential amplifier circuit 550, after level-shifting, outputs an intensity modulating signal which has been supplied to the positive input terminal as a DC component. The level-shifted portion corresponds to the white background of the image. As a result, the differential amplifier circuit 550 then outputs the intensity-modulated signal which has been synchronized in the picture element clock DCK. This signal becomes the drive signal which drives the semiconductor laser 31 on and off.

FIGS. 19A to 19D are timing charts showing the waveforms for the parts of the first drive circuit.

FIG. 19A shows the reference wave standard pulse SCK. This pulse SCK is synchronized with the picture element clock DCK. The signal shown by the broken line in FIG. 19B is a D/A converted analogue density signal after correction for color and gradation; the signal shown by the solid line is a reference wave signal which is the signal output from the buffer 520. FIG. 19C is a signal which has been intensity-modulated by the differential amplifier circuit 540. The reference signal is synchronized with a density signal corresponding to a recorded picture element and an intensity-modulated signal corresponding to the image density is created. FIG. 19D is a signal in which the level of this intensity-modulated signal is shifted. The level-shifted portion corresponds to the white background in the image, as previously discussed.

Figure 20:
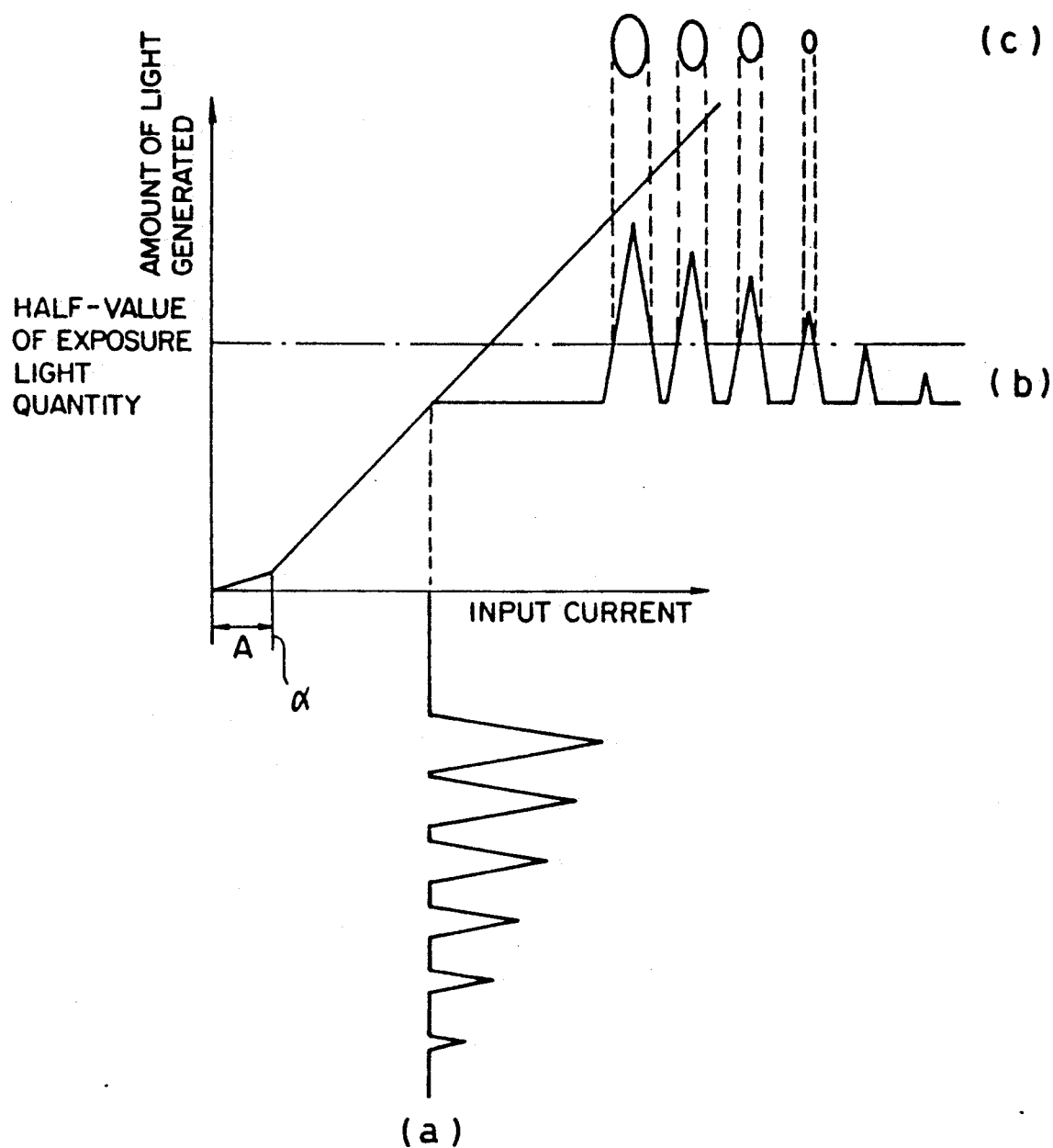
FIG. 20 is an explanatory drawing for explaining the relationship of the amount of light generated from a semiconductor laser by means of an intensity modulating signal in which the level is shifted by the drive circuit of the first embodiment.

FIG. 20 is an explanatory drawing for explaining the relationship between an intensity-modulated signal in which the level is shifted by the drive circuit of the first embodiment and the amount of light from the semiconductor laser 31.

The graph illustrates the input-putput characteristics showing the relationship between the current input to the semiconductor laser 31 and the amount of light. A is a region of natural emission and $\alpha$ is the threshold current value. If a current larger than the threshold current value $\alpha$ is input, induced emission occurs. The section (a) shows the current input to the semiconductor laser 31. As previously discussed, a current for which the level is shifted only for the portion which corresponds to the white background of the image is input to the semiconductor laser 31. As a result, the onset characteristics of the semiconductor laser 31 are improved. The section (b) shows the amount of light from the semiconductor laser 31 corresponding to the current input. The dashed line in the drawing shows the half-value of the amount of exposure light for the high-$\gamma$ photoreceptor used in this embodiment. Specifically, because a high-$\gamma$ photoreceptor is used, the amount of exposure light from the semiconductor laser 31 is the half-value, specifically, one half of the potential $V_0$, i.e. $\frac{1}{2} V_0$. If this is less than the amount of light needed for exposure the latent image is not formed. For this reason, the level-shifted direct current portion is greater than the threshold value $\alpha$ and corresponds to the white background. Specifically, in this embodiment, the semiconductor laser 31 oscillates even in the part which corresponds to the white background. The section (c) shows the exposed dot distribution recorded on the photoreceptor 1. The position of the half-value of the amount of exposure light in the exposed dot distribution is shown by the broken line. The latent images from the high-$\gamma$ photoreceptor characteristics are formed as the portion above this. Specifically, latent images are obtained from various sizes of dots corresponding to the density signal, and the dot-shaped image density distribution formed by developing these latent images is shown. Also, it is possible to form small, sharp, dot-shaped latent images. Because the exposed dot distribution is actually expanded by the blurring of the scanner optical system 3, the diameters of the dots recorded in the high density section are large, while there is a tendency to form small diameter dots in the low density section.

In addition, it is also possible to have the period of the reference wave larger than the recorded picture element period. For example, desirable results are obtained in the same manner with a period which is four times the recorded picture element period.

This embodiment was explained with reference to intensity modulation using the semiconductor laser 31, but the present invention is not limited to such an embodiment. The same effect can be obtained with light modulation by a density signal which is intensity-modulated in the same manner using another light-generating element such as an LED array.

Figure 21:
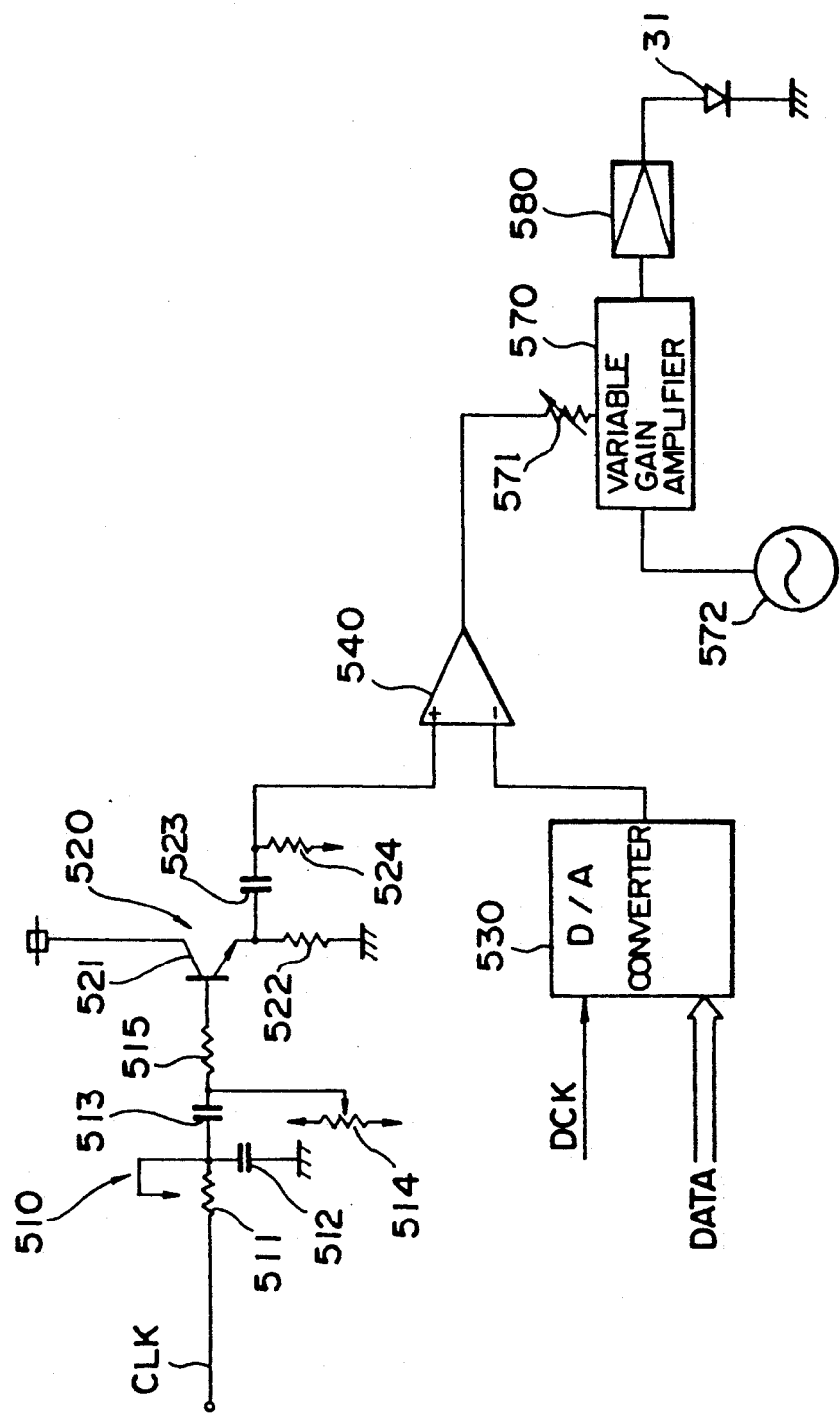
FIG. 21 is a block diagram showing a second embodiment of a drive circuit of the scanner optical system.

FIG. 21 is a block diagram of the drive circuit of a second embodiment of the scanner optical system 3.

The drive circuit 500 intensity-modulates an analogue image density signal (image density data) with the reference wave signal, modulates a carrier wave signal with the intensity modulated signal, then applies the level-shifted modulated signal to the semiconductor laser 31. The drive circuit 500 comprises the reference wave signal generating circuit 510, the buffer circuit 520, the differential amplifier circuit 540, the D/A converter 530, a variable resistance 571, a variable gain amplifier 570, a high band power amplifier 580, and a carrier wave signal generating circuit 572.

The reference wave signal generating circuit 510 generates a triangular wave by means of an integrator comprising the variable resistance 511 and the capacitor 512. The triangular waves are input to the base terminal of the transistor 521 through the capacitor 513 and the protective resistance 515. The reference wave generation circuit 510 is provided with two variable resistances. Specifically, the variable resistance 511 is used to adjust the amplitude of the triangular waves and the variable resistance 514 is used to adjust the bias and the offset of the triangular waves.

FIGS. 22A to 22D are timing charts showing the waveforms for the parts of the drive circuit of this embodiment.

The triangular waves (the solid line in FIG. 22B) are passed through the buffer circuit 520 and input to the positive input terminal of the differential amplifier circuit 540.

An analogue image density signal from an 8-bit digital image density signal which is D/A converted in the D/A converter 530 is output to the negative input terminal of the differential amplifier circuit 540. As a result, the differential amplifier circuit 540 intensity-modulates the analogue image density signal with the reference wave signal and inputs the modulated signal to the variable gain amplifier 570 through the variable resistance element 571. This signal amplitude-modulates a carrier wave of a frequency equal to or exceeding 600 MHz in the variable gain amplifier 570, and a high band voltage which is amplified by the resulting signal in the carrier wave signal generating circuit 580 is applied to the electrode of the semiconductor laser 31. The high band power amplifier 580 is also provided with the function of shifting the level of the modulated signal by means of the DC current component.

Figure 22A:
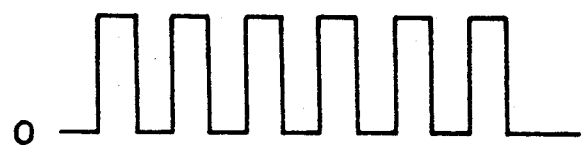
FIGS. 22A to 22D are timing charts showing the waveforms appearing in the parts of the second embodiment of the drive circuit.
Figure 22B:
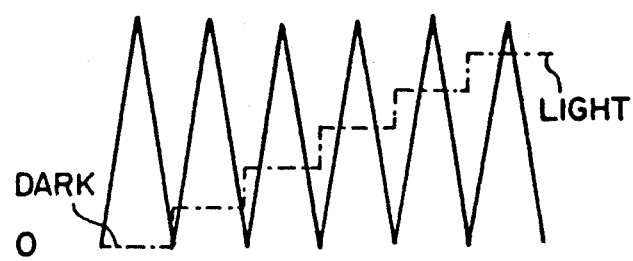
Figure 22C:
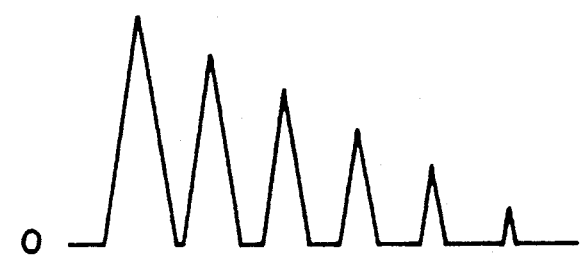
Figure 22D:
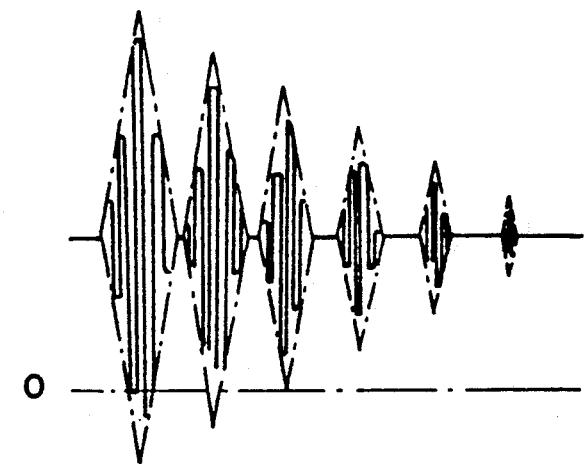

FIG. 22A shows the reference wave standard pulse SCK. This pulse SCK is synchronized in the picture element clock DCK. The signal shown by the broken line in FIG. 22B is a D/A converted analogue density signal after correction for color and gradation; the signal shown by the solid line is a reference wave signal which is the signal output from the buffer 520. FIG. 22C is a signal which has been intensity-modulated by the differential amplifier circuit 540. The reference signal is synchronized with a density signal corresponding to a recorded picture element and an intensity-modulating signal corresponding to the image density is created. FIG. 22D shows a carrier wave signal which has been intensity-modulated with this intensity-modulating signal. Here, the signal is shown after its level is further shifted in the high band power amplifier.

Figure 23:
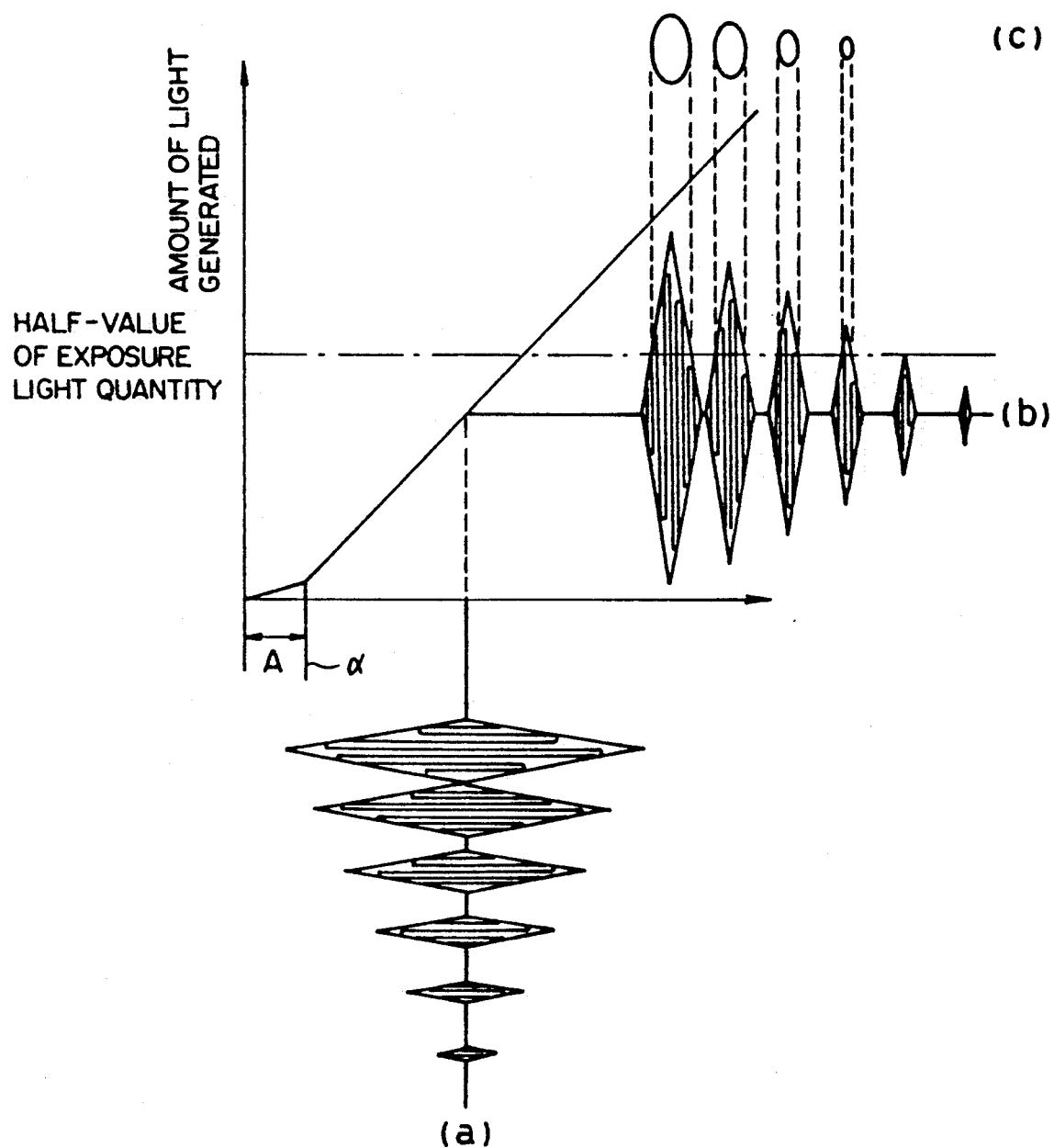
FIG. 23 is an explanatory drawing for explaining the relationship of the amount of light generated from a semiconductor laser by means of an intensity modulating signal in which the level is shifted by the drive circuit of the second embodiment.

FIG. 23 is an explanatory drawing for explaining the relationship between an intensity-modulated signal in which the level is shifted by the drive circuit of the second embodiment and the amount of light from the semiconductor laser.

A is a region of natural emission and $\alpha$ is the threshold current value. If a current larger than the threshold current value $\alpha$ is input, induced emission occurs. Specifically, this is the induced emission region. The section (a) shows the current input to the semiconductor laser 31. As previously discussed, a current for which the level is shifted only for the portion which corresponds to the white background of the image is input to the semiconductor laser 31. As a result, the onset characteristics of the semiconductor laser 31 are improved. The section (b) shows the amount of light from the semiconductor laser 31 corresponding to the current input. The dashed line in the drawing shows the half-value of the amount of exposure light for the high-$\gamma$ photoreceptor used in this embodiment. Specifically, because a high-$\gamma$ photoreceptor is used, the amount of exposure light from the semiconductor laser 31 is the half-value $\frac{1}{2}$ $V_0$. If this is less than the amount of light needed for exposure the latent image is not formed. For this reason, the level-shifted direct current portion is greater than the threshold value $\alpha$ and corresponds to the white background. Specifically, in this embodiment, the semiconductor laser 31 oscillates even in the part which corresponds to the white background. The section (c) shows the exposed dot distribution recorded on the photoreceptor 1. The position of the half-value of the amount of exposure light in the exposed dot distribution is shown by the broken line. The latent images from the high-$\gamma$ photoreceptor characteristics are formed as the portion above this. Specifically, latent images are obtained from various sizes of dots corresponding to the density signal, and the dot-shaped image density distribution formed by developing these latent images is shown. Also, it is possible to form small, sharp, dot-shaped latent images.

Because the exposed dot distribution is actually expanded by the blurring of the scanner optical system 3, the diameters of the dots recorded in the high density section are large, while there is a tendency to form small diameter dots in the low density section.

Figure 24:
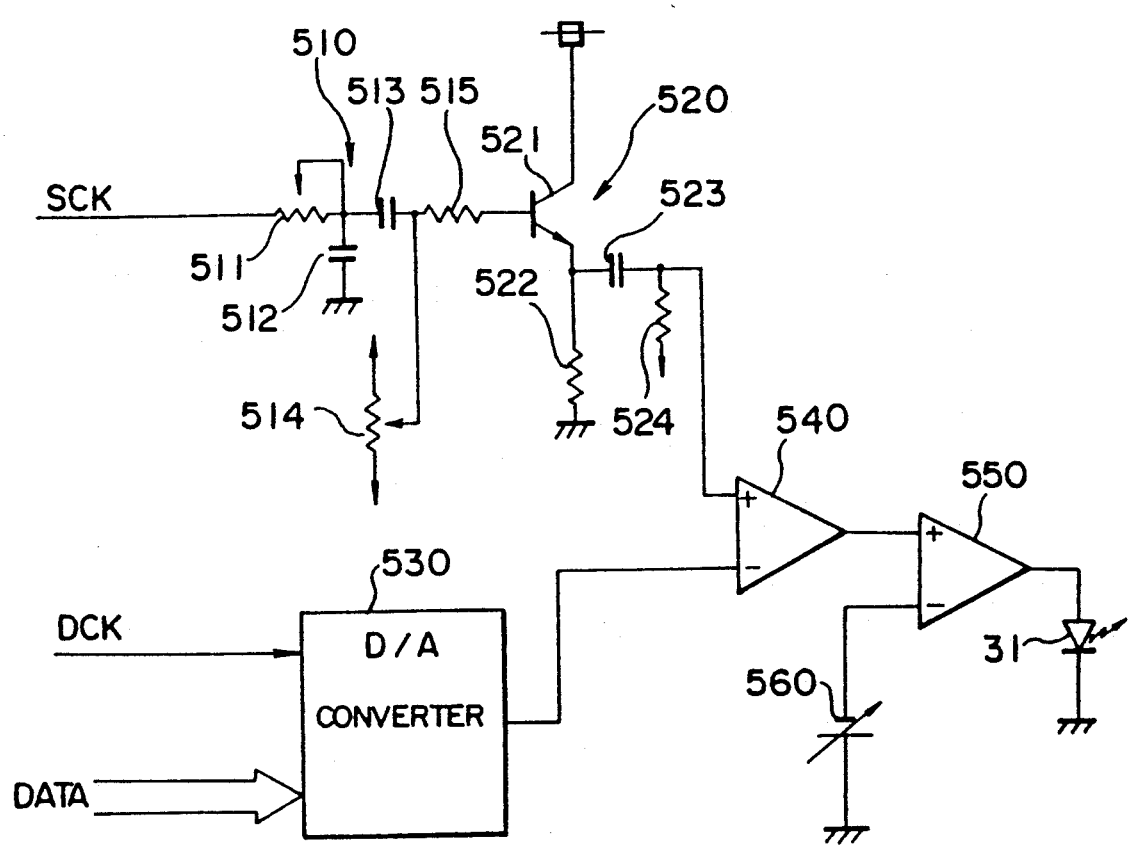
FIG. 24 is a block diagram showing a third embodiment of a drive circuit of the scanner optical system.

FIG. 24 is a block diagram showing a third drive circuit of the scanner optical system.

As illustrated in FIG. 24, the drive circuit 500 comprises the reference wave signal generating circuit 510, the buffer circuit 520, the differential amplifier circuits 540, 550, the variable DC power source 560, and the D/A converter 530.

The reference wave signal generating circuit 510 generates a triangular wave by means of an integrator comprising the variable resistance 511 and the capacitor 512. The triangular waves are input to the base terminal of the transistor 521 through the capacitor 513 and the protective resistance 515. The reference wave generation circuit 510 is provided with two variable resistances. Specifically, the variable resistance 511 is used to adjust the amplitude of the triangular waves, and the variable resistance 514 is used to adjust the bias and the offset of the triangular waves.

The triangular waves are passed through the buffer circuit 520 and input to the positive input terminal of a comparator 541.

The comparator 541 compares the reference wave which has passed through the buffer circuit 520 and an analogue density signal from a fixed bit, for example, an 8-bit digital image density signal which is D/A converted in the D/A converter 530. Then the resulting pulse-width-modulated signal is output to the input terminal of the differential amplifier circuit 550.

The negative input terminal of the differential amplifier circuit 550 is supplied with the output from the variable DC power source 560. The differential amplifier circuit 550, after level-shifting, outputs an intensity modulating signal which has been supplied to the positive input terminal as a DC component. The level-shifted portion corresponds to the white background of the image. As a result, the differential amplifier circuit 550 then outputs the pulse-width-modulated signal with the DC portion which has been synchronized in the picture element clock DCK. This signal becomes the drive signal which drives the semiconductor laser 31 on and off.

FIGS. 25A to 25D are timing charts showing the waveforms for the parts of the third drive circuit.

Figure 25A:
FIGS. 25A to 25D are timing charts showing the waveforms appearing in the parts of the third embodiment of the drive circuit.
Figure 25B:
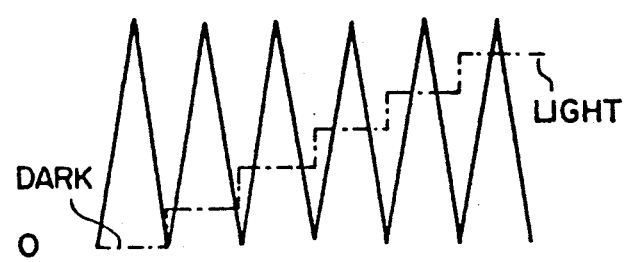
Figure 25C:
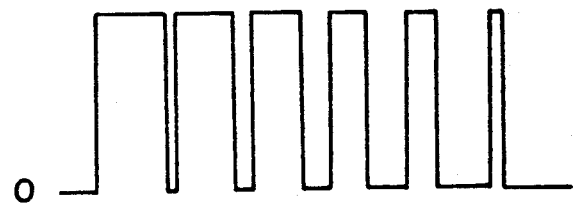
Figure 25D:
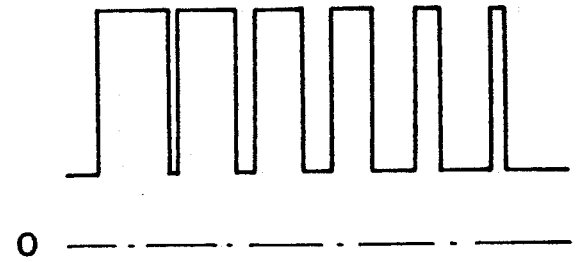

FIG. 25A is the reference wave standard pulse SCK. This pulse SCK is synchronized in the picture element clock DCK. The signal shown by the broken line in FIG. 25B is a D/A converted analogue density signal after correction for color and gradation; the signal shown by the solid line is a reference wave signal which is the signal output from the buffer 520. FIG. 25C is a signal which has been pulse-width-modulated by the converter 541. The reference signal is synchronized with a density signal corresponding to a recorded picture element and an pulse-width-modulated signal corresponding to the image density is created. FIG. 25D is a signal in which the level of this pulse-width-modulated signal is shifted. The level-shifted portion corresponds to the white background in the image, as previously discussed.

Figure 26:
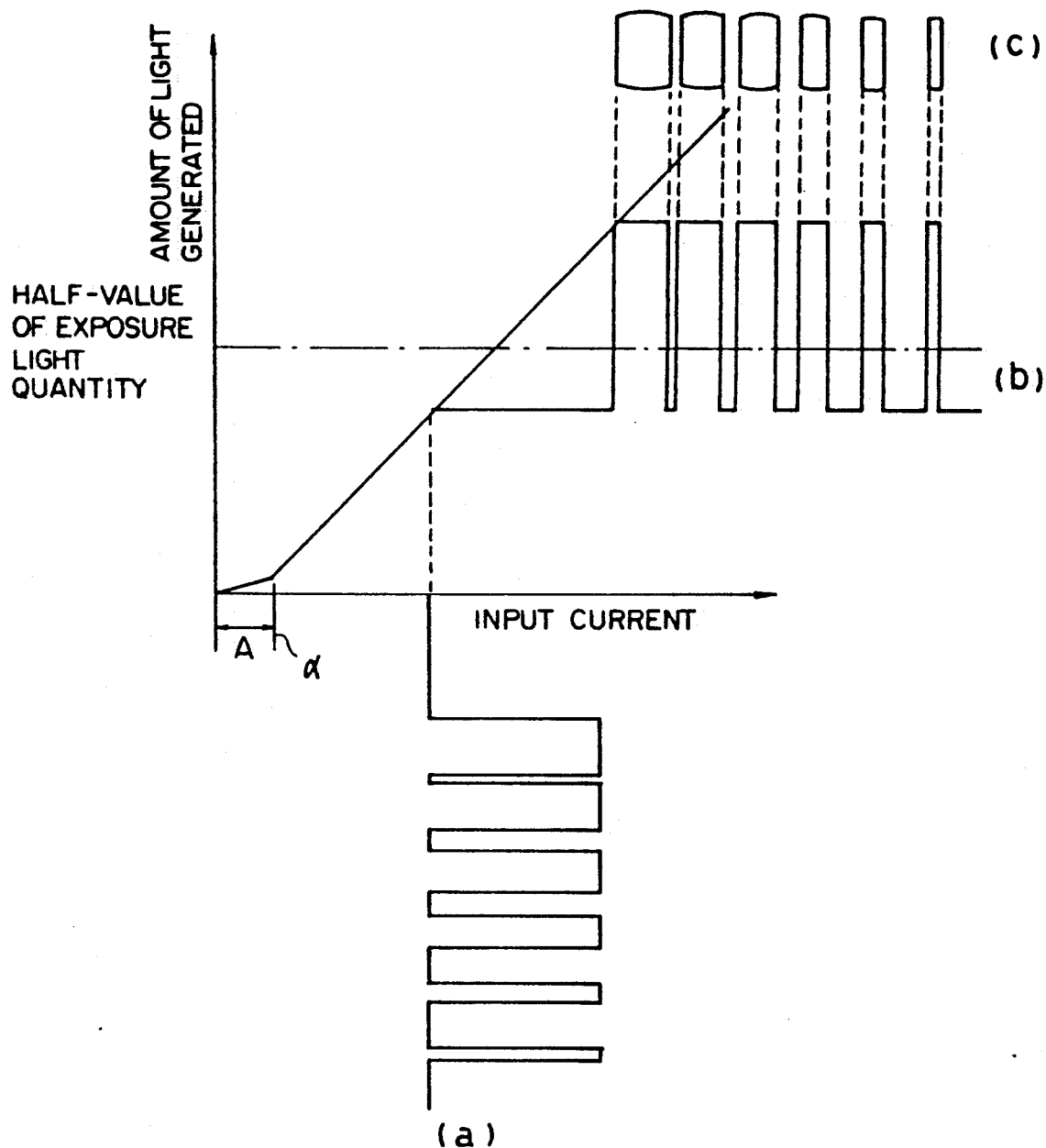
FIG. 26 is an explanatory drawing for explaining the relationship between a pulse width modulated signal in which the level is shifted by the drive circuit of the third embodiment and the amount of light from the semiconductor laser.

FIG. 26 is an explanatory drawing for explaining the relationship between a pulse-width-modulated signal in which the level is shifted by the drive circuit of the third embodiment and the amount of light from the semiconductor laser.

The graph illustrates the input-putput characteristics showing the relationship between the current input to the semiconductor laser 31 and the amount of light. A is a region of natural emission and $\alpha$ is the threshold current value. If a current larger than the threshold current value $\alpha$ is input, induced emission occurs. Specifically, this is the induced emission region. The section (a) shows the current input to the semiconductor laser 31. As previously discussed, a current for which the level is shifted only for the portion which corresponds to the white background of the image is input to the semiconductor laser 31. As a result, the onset characteristics of the semiconductor laser 31 are improved. The section (b) shows the amount of light from the semiconductor laser 31 corresponding to the current input. The dashed line in the drawing shows the half-value of the amount of exposure light for the high-$\gamma$ photoreceptor used in this embodiment. Specifically, because a high-$\gamma$ photoreceptor is used, the amount of exposure light from the semiconductor laser 31 is the half-value, specifically, one half of the potential $V_0$, i.e. $\frac{1}{2}$ $V_0$. If this is less than the amount of light needed for exposure the latent image is not formed. For this reason, the level-shifted direct current portion is greater than the threshold value $\alpha$ and corresponds to the white background. Specifically, in this embodiment, the semiconductor laser 31 oscillates even in the part which corresponds to the white background. The section (c) shows the exposed dot distribution recorded on the photoreceptor 1. The position of the half-value of the amount of exposure light in the exposed dot distribution is shown by the chain line. The portion of the exposed dot above this line is formed as a latent image. Specifically, the exposed dot distribution is expanded by the blurring of the elliptical beam of the scanner optical system, and the position of the half-value of the amount of exposure light in the exposed dot distribution is shown by the chain line. The portion of the exposed dot above this line is formed as a latent image. Specifically, latent images are obtained from various sizes of dots corresponding to the density signal, and the dot-shaped image density distribution formed by developing these latent images is shown. Also, it is possible to form small, sharp, dot-shaped latent images.

Because the exposed dot distribution is actually expanded more than the blurring of the scanner optical system 3, the diameters of the dots recorded in the high density section are large, while there is a tendency to form small diameter dots in the low density section.

Because the image forming device of the present invention is provided with a photoreceptor with light damping characteristics by which the potential of the photoreceptor is not damped in the initial stages of exposure, but is steeply damped in the middle stages of exposure, when an image density signal is modulated by a reference wave signal and a semiconductor laser is caused to oscillate by this modulated signal to form an image, the response to the drive signal is improved by providing a direct current portion in the modulated signal corresponding to the white background of the image density signal so that changes in the beam intensity which occur mainly because of the environment, such as heat or the like, are reduced, so that the image forming device is able to form stable latent images.

In addition, even though the charge potential is reduced to one-half of the exposure intensity corresponding to the white background, if the required exposure intensity is almost the same or less than half the quantity of light used for exposure, the image forming device of the present invention is able to form small, sharp, latent images.

Also, because the modulation signal is the image density signal with a DC component from the reference wave, the unit is stable with respect to noise resulting from temperature changes and changes in the amount of feed-back light, and because no noise spikes are produced, the image forming device of the present invention is able to form stable latent images.

By the use of a modulated signal obtained by amplitude-modification of a high frequency signal by a signal obtained by modulating the image density signal with the previously-mentioned reference signal, as outlined above, the unit is stable with respect to noise resulting from temperature changes and changes in the amount of feed-back light, and because no noise spikes are produced, the image forming device of the present invention is able to form stable latent images.

By pulse-width-modification of the image density signal by the reference wave signal the image forming device of the present invention is able to form small, sharp, latent images.

Figure 27:
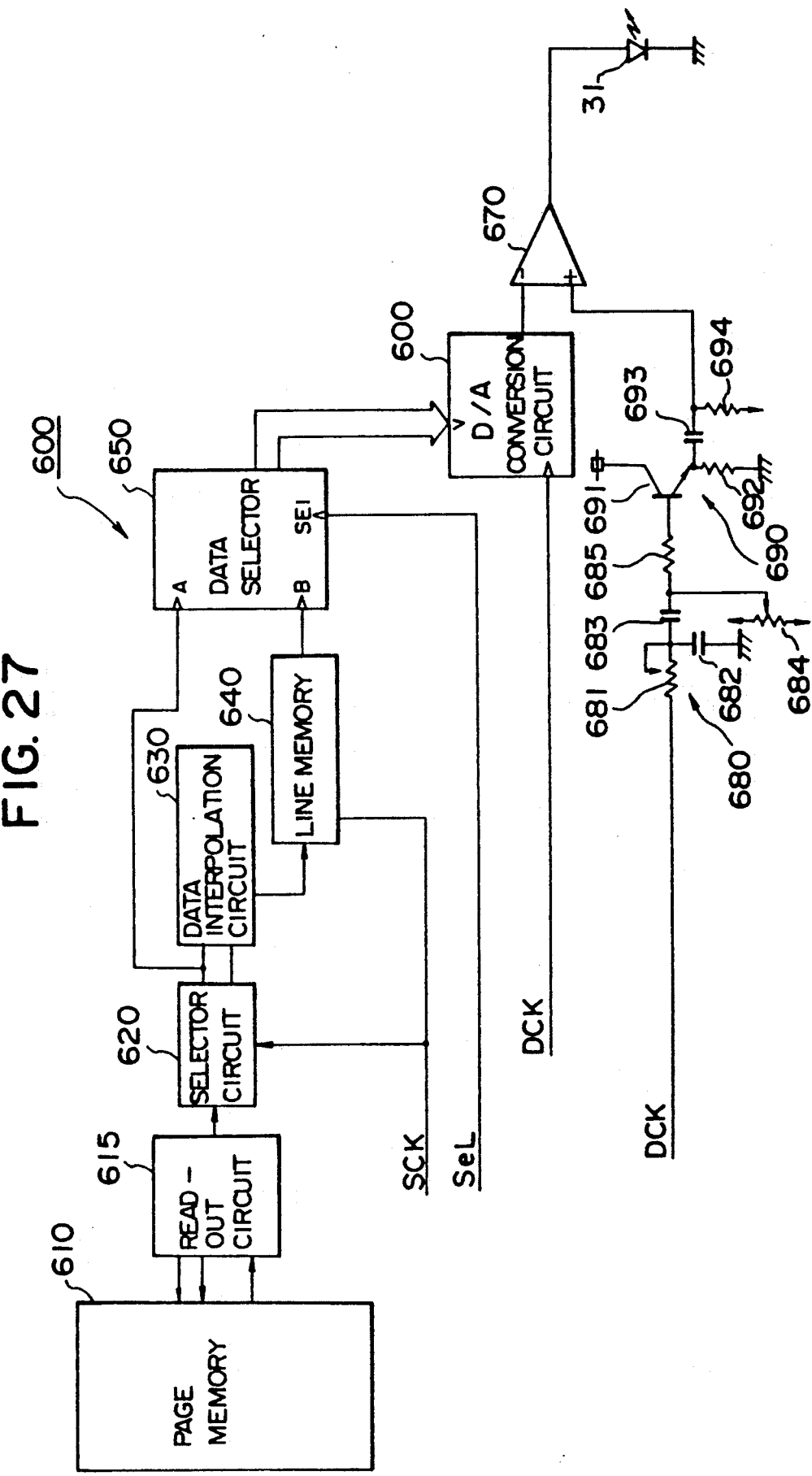
FIG. 27 is a block diagram showing the configuration of the principal parts of a fourth embodiment of a drive circuit of the scanner optical system.

FIG. 27 is a block diagram showing the configuration of the principal parts of the drive circuit of the scanner optical system. This embodiment of the image forming device of the present invention is provided with a page memory 610 in which image density data for the yellow, magenta, cyan, and black colors is recorded. The page memory is connected to various circuits which will now be explained. To simplify the explanation, the drive circuit will be explained with respect to specific colors in the page memory.

As shown in FIG. 27, a drive circuit 600 of the scanner optical system 3 forms a pulse width modulation signal based on image density data from a computer or a scanner, and drives the semiconductor laser 31 with the modulation signal. The laser drive circuit 600 is provided with a feedback means which feeds back a signal corresponding to the amount of light in the beam from the semiconductor laser 31, but a fixed amount of light may also be used.

As shown in FIG. 27, the drive circuit 600 comprises the page memory 610, a read-out circuit 615, a selector circuit 620, a data interpolation circuit 630, a line memory 640, a data selector 650, a D/A conversion circuit 660, a comparator 670, a reference wave signal generating circuit 680, and a buffer circuit 690.

The page memory 610 is an SRAM which stores one page of image density data after correction for color or gradation. One picture element of image density data is 8 bits per color.

The read-out circuit 615 reads out image density data via a data bus for a previously transmitted address based on a read-out signal RD. The read-out circuit 615 is connected to an address bus which designates the address, a signal line which outputs the read-out signal RD, and the data bus which inputs image density data of a specified number of bits (8 bits in this embodiment). The read-out signal RD has a period twice that of a system clock pulse SCK (hereinafter simply SCK), and the read-out circuit 615 reads out image density data of two picture elements serially in the auxiliary scanning direction for one SCK cycle alternately.

Although omitted from the drawings, a write-in circuit is provided for writing image density data into the page memory 610 by means of a write-in signal WD with the same period as the read-out signal RD.

The selector circuit 620 symmetrically splits the image density data for two picture elements in the auxiliary scanning direction sent out serially in one SCK cycle into various units of auxiliary scanning data, and outputs this data. Specifically, the image density data for two picture elements in the auxiliary scanning direction sent out in parallel in one SCK cycle is alternately latched at the leading and the trailing edges of the SCK, and is also latched to align the phases based on the SCK. The selector circuit 620 is connected to two 8-bit output data buses, and one of these data buses is connected to a data terminal A of the data selector 650. Specifically, the data is output to the data interpolation circuit 630 and the data selector 650 simultaneously in synchronism with the SCK.

The data interpolation circuit 630 calculates the image density data for two picture elements which has been input in parallel with one SCK cycle, and transmits it to the line memory 640. Specifically, the sum of the image density data for two picture elements two picture elements is divided in two and transmitted to the line memory 640. It is also possible to interpolate at a picture element interval of greater than two at a time in the data interpolation circuit 630, for example, at 7×7, for greater recording precision.

The line memory 640 comprises an SRAM and has a capacity equivalent to 5000 picture elements of image density data. The line memory 640 has an action similar to that of a shift register for driving based on the system clock pulse SCK. The image density data is output from the output data bus at the $5000^{th}$ clock pulse after the image density data for one picture element has been input. The 8-bit output data bus of the line memory 640 is connected to a data terminal B of the data selector 650.

The data selector 650 is a circuit which outputs image density data from one of the data terminals A, B depending on the condition of the select signal. Specifically, based on the condition of the select signal, the image density data or the interpolated data is output alternately for one line at a time of the main scan. The select signal converts the conditions based on an output signal from, for example, the index sensor 39, and this signal converts the conditions at a period equivalent to one line in the main scanning direction, which here is equivalent to 5000 periods of the picture element clock DCK. The 8-bit output data bus of the data selector 650 is connected to the data terminal of the D/A converter 660. The output signal from the data selector 650 (image density data or interpolated data) is output based on the system clock pulse SCK.

The D/A converter 660 performs a D/A conversion on the 8-bit image density data or interpolated data based on the picture element clock DCK and inputs the converted data to the negative input terminal of the comparator 670. The analogue signal for which the interpolated data is D/A converted will hereinafter be referred to as the analogue interpolated density data. In addition, the analogue signal for which the image density data is D/A converted will hereinafter be referred to as the analogue image density data.

The converter 670 compares the reference wave which passes through the later-described buffer circuit 690 with the analogue density signal, which is the digital image density data from a specified number of bits, for example, 8 bits, converted in the D/A converter 660, to obtain a pulse-width-modulated signal. This signal becomes a drive signal for driving the semiconductor laser 31 on and off.

The reference wave signal generating circuit 680 generates triangular waves by means of an integrator comprising a variable resistance 681 and a capacitor 682. The triangular waves are input to the base terminal of a transistor 691 through a capacitor 683 and a protective resistance 685. The reference wave generating circuit 680 is provided with two variable resistances. Specifically, the variable resistance 681 is used to adjust the amplitude of the triangular waves. A variable resistance 684 is used to adjust the bias and the offset of the triangular waves.

Figure 28A:
FIGS. 28A to 28G are timing charts for explaining the operation of entering, in parallel, image density data corresponding to picture elements in a line which differs from the page memory to an interpolated data generation circuit.
Figure 28B:
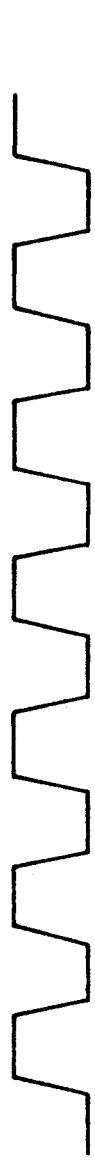
Figure 28C:
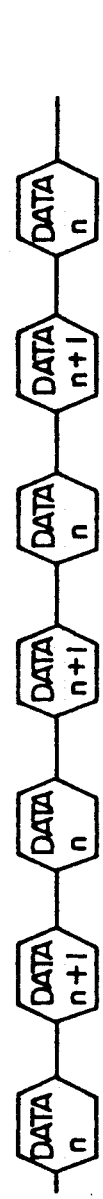

FIGS. 28A to 28G are timing charts for explaining the action of entering, in parallel, to an interpolated data generation circuit, image density data corresponding to picture elements in a line which differs from the page memory. FIGS. 28A to 28C are timing charts for explaining the action of reading out image density data from the page memory.

FIG. 28A shows addresses from the read-out circuit 615. The phase of such an address is advanced with respect to the phase of the read-out signal RD.

FIG. 28B shows the read-out signal RD from the read-out circuit 615. This signal has a period double that of the system clock pulse SCK. This signal is, in this example, a low-active signal. Specifically, when this signal is at the low level, it reads out the image density data corresponding to the address shown in FIG. 28A. FIG. 28C shows the image density data corresponding to the low level of the read-out signal RD.

Figure 28D:
Figure 28E:
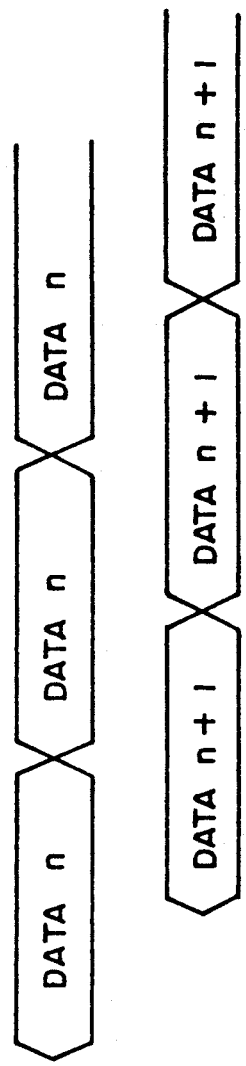
Figure 28F:
Figure 28G:
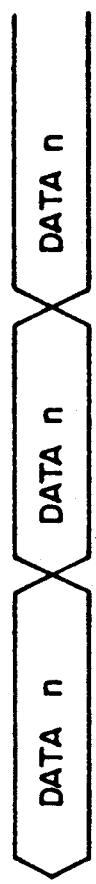

FIGS. 28D to 28G are timing charts for explaining the action of the selector circuit 620. FIG. 28D shows the system clock pulse SCK. FIG. 28E shows the image density data which is latched at the onset of the system clock pulse SCK. FIG. 28F shows the image density data which is latched at the trailing edge of the system clock pulse SCK. At this time, the phase of the image density data shown in FIG. 28E and FIG. 28F differs by ½ period from the phase of the system clock pulse SCK. The image density data shown in FIG. 28E is latched at the trailing edge of the system clock pulse SCK. Accordingly, the selector circuit 620 can output the serially-input image density data in parallel.

FIGS. 29A to 29E are timing charts for explaining the action of the drive circuit of this embodiment.

This operation, by which the image density data and the interpolated data are switched after each line, will now be explained.

Figure 29A:
FIGS. 29A to 29E are timing charts for explaining the operation of a fourth embodiment of the drive circuit of this embodiment.
Figure 29B:
Figure 29C:
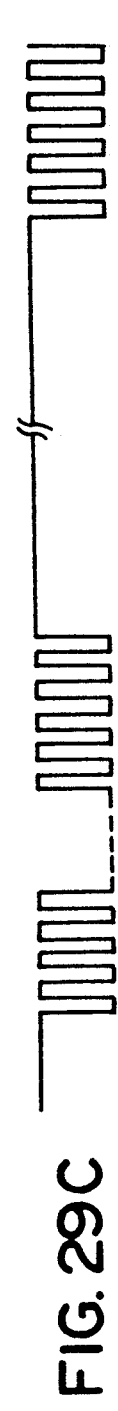
Figure 29D:
Figure 29E:

FIG. 29A shows the system clock pulse SCK. FIG. 29B shows the select signal which is input to the data selector 650. FIG. 29C shows the read-out signal RD of the read-out circuit 615, wherein the input and the not-input states are switched synchronously with the select signal. FIG. 29D shows the image density data output from the read-out circuit 615. Once a read-out is made, image density data corresponding to two lines in the direction of the main scan is output in one period. FIG. 29E shows the image density data which is input to the data terminal A of the data selector 650. This shows image density data being output on every second line successively. Although omitted from the drawings, the interpolated data, offset by one line, is output to a data terminal B of the data selector 650 on every second line.

FIGS. 30A to 30D are timing charts for explaining the pulse-width-modulation operation by a reference wave signal on an analogue image density signal and on an analogue interpolated density signal, entered on alternate lines.

Figure 30A:
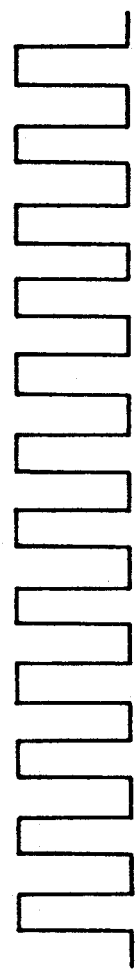
FIGS. 30A to 30D are timing charts for explaining the operation of the pulse width modulation by a reference wave signal on an analogue image density signal, entered on alternate lines, and on an analogue interpolated density signal.
Figure 30B:
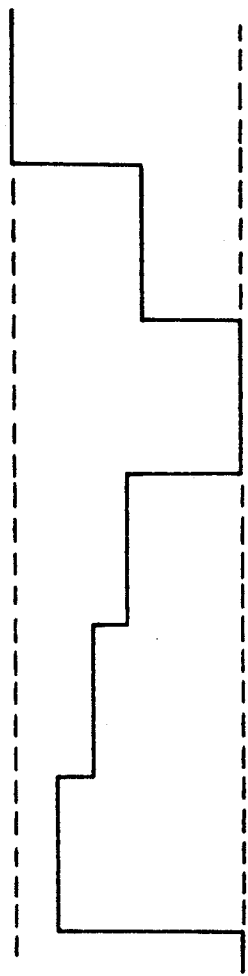
Figure 30C:
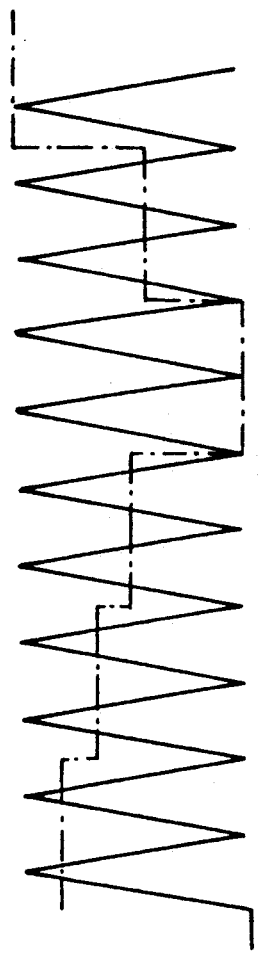
Figure 30D:

FIG. 30A shows the picture element clock pulse DCK, for which the period is twice that of the system clock SCK. FIG. 30B shows the analogue image density signal or the analogue interpolated density signal which is output to the D/A converter circuit 660. The broken line in FIG. 30C shows the D/A converted analogue image density signal or analogue interpolated density signal, while the solid line shows the reference wave signal which is output from the buffer 690. FIG. 30D shows a signal which is pulse-width-modulated by the comparator 670. The density signal corresponding to the recorded picture element and the reference signal are synchronous. A pulse-width-modulated signal is produced which corresponds to the image density.

Figure 31:
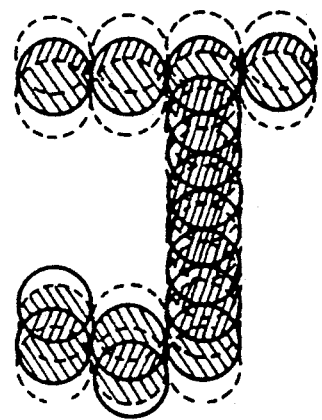
FIG. 31 is a view of a typical electrostatic latent image formed on the photoreceptor during scanning by the drive circuit of the fourth embodiment.

FIG. 31 is a view of a typical electrostatic latent image formed on the photoreceptor 1 during scanning by the drive circuit of this embodiment.

In the drawing, the circular symbols shown in dotted lines indicate the scanning path when the semiconductor laser 31 is driven by an analogue interpolated density signal. The circular symbols shown in solid lines indicate the scanning path when the semiconductor laser 31 is driven by an analogue density signal. The speed of rotation of the photoreceptor 1 is such that the spot advances ½ line only during the scanning of one line by the scanner optical system 3. Here, the amount of exposure light of the spot is less than the half-reduced amount $P_{\frac{1}{2}}$, and is set to be greater than the half-reduced amount $P_{\frac{1}{4}}$ when the same position on the photoreceptor 1 is scanned a multiple number of times. In the present embodiment the amount of exposure light P is set at $0.7P_{\frac{1}{2}}$. Specifically, in the initial stages of exposure of the photoreceptor 1, a carrier originating on the surface of the photoconductive pigment is effectively trapped in the interface layer between the pigment and a covering resin and damping is reliably restrained. As a result of the second scan, this carrier is released and avalanche developing is produced very suddenly in the middle stages of the exposure. An electrostatic latent image of a specified potential is therefore formed. The electrostatic latent image is shown by the crosshatching.

At this point, as a result of the second scan, the half-reduced amount of exposure light $P_\frac{1}{2}$ is first arrived at, but is not reached prior to this.

The portion greater than the half-reduced amount of exposure light $P_\frac{1}{2}$ is formed as a latent image as a result of the characteristics of the high-$\gamma$ photoreceptor 1. Specifically, the distribution of the exposed dots is expanded as a result of the lack of sharpness of the scanner optical system because the beam is elliptical. The position of the half-reduced amount of exposure light within the exposed dot distribution is indicated by the broken line. The portions other than this are formed as latent images as a result of the characteristics of the high-$\gamma$ photoreceptor 1. Specifically, latent images are obtained from various sizes of dots corresponding to the density signal, and the dot-shaped image density distribution formed by developing these latent images is shown. Also, it is possible to form small, sharp, dot-shaped latent images.

The image forming process of the digital image forming device of the present invention will now be explained.

The image is exposed by a beam of light from the scanner optical system 3 and an electrostatic latent image is formed on the drum-shaped photoreceptor, corresponding to the various colors. Among these electrostatic latent images, the electrostatic latent image corresponding to the color yellow is formed by the application of a laser beam which is light modulated by the yellow data (digital density data). The electrostatic latent image corresponding to the color yellow is developed by the first developing apparatus 4A and a first dotted toner image (yellow toner image) of extremely high clarity is formed on the photoreceptor 1. A charge is once more applied to the photoreceptor 1 by the scorotron charging apparatus 2 without transferring the first toner image onto a printing paper P.

Next, the laser beam is light modulated by the magenta data (digital density data), and the modulated laser beam is directed onto the photoreceptor 1 to form an electrostatic latent image. This electrostatic latent image is developed by the second developing apparatus 4B and a second toner image (magenta toner image) is formed. Then, in the same manner as previously described, the next developing step is carried out by the third developing apparatus 4C and a third toner image (cyan toner image) is formed, so that these three color toner images are formed in successive layers on the photoreceptor 1. Finally, a fourth toner image (black toner image) is formed so that there are four color toner images formed in successive layers on the photoreceptor 1.

The photoreceptor of the image forming device 600 of this embodiment has superior high $\gamma$ characteristics. Furthermore, even when toner images are repeatedly superimposed on these toner images with superior high $\gamma$ characteristics by performing the charging, exposing, and developing processes many times, a stable latent image is formed. Specifically, a dotted electrostatic latent image of high clarity and without fringes can be formed by shining a beam on a toner image, based on a digital signal. As a result, a high clarity toner image can be obtained.

This four-color toner image is transferred onto the recording paper P supplied from a paper supply device, using the transfer apparatus 62, after the photoreceptor 1 is charged by the pre-charging apparatus 61 (although this pre-charging step can be omitted).

The recording paper P bearing the transferred toner image is separated from the photoreceptor 1 by the separating apparatus 63, is conveyed by a guide and conveyor belt, supplied to the fixing roller 64 where it is fixed by the application of heat, then discharged to a paper discharge tray.

After the transfer from the photoreceptor 1 has been completed, toner remaining on the surface of the photoreceptor 1 is removed by a blade, fur brush, or magnetic brush on the cleaning device 70 which is inactivated during toner image formation. The charge is removed by a lamp, which is not used during toner image formation, or by the corona neutralization apparatus 74 so there are no obstacles to the formation of the next multi-colored image. The lamp or neutralization apparatus 74 may be installed immediately before cleaning.

It is possible to use reference waves of other shapes.

As another example of a reference wave, an image with gradation of high clarity can be obtained in the same manner by selection of two triangular waves in one period of a magnitude which is in agreement with a period twice that of the recorded picture element (the period is double that of a recorded picture element). In addition, in the case where identical triangular waves are used (where one period is the same as that of the recorded picture element) a clear image with high resolution is obtained. Generally, with a high-$\gamma$ photoreceptor image reproduction tends to exhibit contrast, and having multiple peaks in one period of the reference wave is effective in improving gradation.

In addition, it is also possible to have the period of the reference wave larger than the recorded picture element period. For example, desirable results are obtained in the same manner with a period which is four times the recorded picture element period.

This embodiment was explained with reference to pulse width modulation using the semiconductor laser 31, but the present invention is not limited to such an embodiment. The same effect can be obtained with light modulation by a density signal which is intensity modulated in the same manner using another light generating element such as an LED array.

In this embodiment, intensity modulation using the semiconductor laser 31 can also be applied. In this case, intensity-modulation can be carried out by use of a differential amplifier in place of the comparator 570 shown in FIG. 27. In addition, the same effect can be obtained with light modulation by a density signal which is intensity-modulated in the same manner using another light generating element such as an LED array in place of the laser.

With the above-described pulse-width-modulation and intensity-modulation it is possible to modify the print density to conform to the printed detail. Specifically, it is possible to change the density by shifting the DC component of the reference wave.

The number of scans can easily be increased in the present invention. The latent image forming method in which the latent images are formed by making multiple optical scans of the photoreceptor at the same position exhibits the feature whereby recording does not occur at the $n-1^{th}$ scan, but does occur at the $n^{th}$ scan. Specifically, the photoreceptor is provided with light damping characteristics whereby the potential of the photoreceptor is not damped in the initial stages of exposure, but is steeply damped in the middle stages of exposure; and when the half-value of the amount of light required for exposure by the photoreceptor is $P_{\frac{1}{2}}$, the amount of light P used for exposure and the number of scans n satisfy the following relationship:

$$1/n \times P_{\frac{1}{2}} < P < 1/(n-1) \times P_{\frac{1}{2}}.$$

Here, the amount of light P used for exposure shows the amount of light from the scanner optical system on each unit of area of the photoreceptor.

$P_{\frac{1}{2}}$ is half the required amount of light for exposure to reduce the potential on the surface of the photoreceptor by half.

In the digital image forming method of the present invention, recording is possible with high precision in the case where information from the font data in the page memory is developed in a bit map and, as previously discussed, the photoreceptor is provided with light damping characteristics whereby the photoreceptor potential is not damped in the initial stages of exposure, but is steeply damped in the middle stages of exposure; and when the half-value of the amount of light required for exposure by the photoreceptor is $P_{\frac{1}{2}}$, the amount of light P used for exposure and the number of scans n satisfy the following relationship:

$$1/n \times P_{\frac{1}{2}} < P < 1/(n-1) \times P_{\frac{1}{2}}.$$

It is therefore possible to provide a latent image forming method whereby high density recording can be carried out by an optical scanning system without encountering beam diameter expansion caused by the MTF of the optical system.

What we claim is:

1. A digital image forming device comprising:
    a light source means for generating a modulated light beam that is modulated by an image density modulating signal;
    means for forming an electrostatic latent image on a photoreceptor, said photoreceptor being positioned to receive the modulated light beam, said electrostatic latent image being formed as a plurality of dots on the photoreceptor by the modulated light beam;
    means for developing the electrostatic latent image on the photoreceptor to form a developed image on the photoreceptor;
    light decay means in the photoreceptor for providing the photoreceptor with a light decay characteristic wherein an initial potential of the photoreceptor does not substantially decay during an initial stage of an exposure of the photoreceptor to the modulated light beam and wherein the initial potential steeply decays to a value less than half the initial potential in a middle stage of the exposure of the photoreceptor to the modulated light beam;
    a reference wave signal generating means for generating a reference wave signal having a predetermined waveform; and
    a modulating circuit for modulating an image density signal with the reference wave signal and for outputting the image density modulating signal.

2. The digital image forming device according to claim 1, wherein the light source means comprises a semiconductor laser which emits a laser beam that is modulated by the image density modulating signal to provide a modulated laser beam.

3. The digital image forming device according to claim 1, wherein the developing means develops the electrostatic latent image with an AC bias supplied by an AC power source.

4. A digital image forming device comprising:
    a light source means for generating a modulated light beam that is modulated by an image density modulating signal;
    means for forming an electrostatic latent image on a photoreceptor, said photoreceptor being positioned to receive the modulated light beam, said electrostatic latent image being formed as a plurality of dots on the photoreceptor by the modulated light beam;
    means for developing the electrostatic latent image on the photoreceptor to form a developed image on the photoreceptor;
    a reference wave signal generating means for generating a reference wave signal having a predetermined waveform and a plurality of peaks in a predetermined period thereof; and
    a modulating circuit for modulating an image density signal with the reference wave signal and for outputting the image density modulating signal.

5. The digital image forming device according to claim 4, wherein the light source means comprises a semiconductor laser which emits a laser beam that is modulated by the image density modulating signal to provide a modulated laser beam.

6. The digital image forming device according to claim 4, wherein the reference wave signal generating means further comprises means for independently varying at least one of the plurality of peak values of the reference wave signal.

7. The digital image forming device according to claim 2, wherein the light source means further comprises an acousto-optic modulating means for modulating the laser beam with the image density modulating signal.

8. The digital image forming device according to claim 2 wherein the semiconductor laser is connected to be driven by the image density modulating signal.

9. The digital image forming device according to claim 8 wherein the image density modulating signal comprises a direct current component corresponding to a white background of the developed image to be formed on the photoreceptor.

10. The digital image forming device according to claim 9, wherein the light source means further comprises:
    means for exposing the photoreceptor to a predetermined exposure intensity; and
    an exposure intensity corresponding to the white background of the developed image being not more than one half of the predetermined exposure intensity.

11. The digital image forming device according to claim 1, wherein the reference wave signal generating means generates a reference wave signal having a plurality of peaks in a predetermined period thereof.

12. The digital image forming device according to claim 11, wherein the reference wave signal generating means further comprises means for independently varying at least one of the plurality of peak values of the reference wave signal.

13. The digital image forming device according to claim 1, wherein the photoreceptor comprises a photoconductive semiconductor powder having phthalocyanine dispersed therein.

14. The digital image forming device according to claim 1, wherein the developing means develops the electrostatic latent image without contacting the latent image.

15. A digital image forming method wherein a plurality of optical scans are made on a photoreceptor by a laser beam to form an electrostatic latent image in the form of dots, the electrostatic latent image being developed to form a developed image; the method further comprising controlling the decay of an initial potential provided on the photoreceptor so that the initial potential does not substantially decay in an initial stage of an exposure of the photoreceptor to the laser beam, said initial potential being controlled to steeply decay from the initial potential to less than half the initial potential in a middle stage of the exposure of the photoreceptor to the laser beam; and wherein when a half-value of an amount of light used for a given exposure of the photoreceptor is $P_{\frac{1}{2}}$, and an amount of light used for the given exposure is P and a number of optical scans by the laser beam is n then the following relation is satisfied:

$$1/n \times P_{\frac{1}{2}} < P < 1/(n-1) \times P_{\frac{1}{2}}.$$

* * * * *